US012626877B2

(12) United States Patent
Yoo

(10) Patent No.: US 12,626,877 B2
(45) Date of Patent: May 12, 2026

(54) MOVABLE CONTACT PART AND DIRECT CURRENT RELAY COMPRISING SAME

(71) Applicant: LS ELECTRIC CO., LTD., Anyang-si (KR)

(72) Inventor: Jung Woo Yoo, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 337 days.

(21) Appl. No.: 18/035,471

(22) PCT Filed: Nov. 2, 2021

(86) PCT No.: PCT/KR2021/015637
§ 371 (c)(1),
(2) Date: May 4, 2023

(87) PCT Pub. No.: WO2022/098032
PCT Pub. Date: May 12, 2022

(65) Prior Publication Data
US 2024/0021389 A1 Jan. 18, 2024

(30) Foreign Application Priority Data
Nov. 4, 2020 (KR) ........................ 10-2020-0146299

(51) Int. Cl.
*H01H 53/04* (2006.01)
*H01H 50/36* (2006.01)
(Continued)

(52) U.S. Cl.
CPC ............ *H01H 50/36* (2013.01); *H01H 50/54* (2013.01); *H01H 53/02* (2013.01); *H01H 53/04* (2013.01)

(58) Field of Classification Search
CPC ....... H01H 53/02; H01H 37/66; H01H 77/101
(Continued)

(56) References Cited

U.S. PATENT DOCUMENTS 3,887,888 A * 6/1975 Bayles ..................... H01H 1/50 335/16
4,513,270 A * 4/1985 Belbel .................. H01H 77/101 335/16
(Continued)

FOREIGN PATENT DOCUMENTS

DE 102011001497 A1 9/2012
EP 1210494 B1 11/2005
(Continued)

OTHER PUBLICATIONS

International Search Report for related International Application No. PCT/KR2021/015637; action dated Jun. 2, 2022; (5 pages).
(Continued)

*Primary Examiner* — Alexander Talpalatski
(74) *Attorney, Agent, or Firm* — K&L Gates LLP

(57) ABSTRACT

Disclosed are a movable contact part and a direct current relay comprising the same. The movable contact part, according to one embodiment of the present disclosure, comprises a coupling part which is provided to each component. The coupling part provided to each component is coupled to the coupling part provided to another adjacently positioned component.
Thus, a coupled state between each of the components constituting the movable contact part may be easily and stably formed.

19 Claims, 40 Drawing Sheets

(51) Int. Cl.
*H01H 50/54* (2006.01)
*H01H 53/02* (2006.01)

(58) Field of Classification Search
USPC ................ 335/196, 126, 147, 194, 195, 131
See application file for complete search history.

(56) References Cited

U.S. PATENT DOCUMENTS

| | | | | | |
|---|---|---|---|---|---|
| 4,593,260 | A * | 6/1986 | Guero | H01H 77/101 | 335/147 |
| 8,138,863 | B2 * | 3/2012 | Tanaka | H01H 50/38 | 335/131 |
| 9,269,507 | B2 * | 2/2016 | Enomoto | H01H 1/54 | |
| 9,281,148 | B2 * | 3/2016 | Enomoto | H01H 50/36 | |
| 11,289,296 | B2 * | 3/2022 | Minowa | H01H 50/58 | |
| 11,574,784 | B2 * | 2/2023 | Yoo | H01H 50/56 | |
| 11,670,472 | B2 * | 6/2023 | Zhong | H01H 50/546 | 335/2 |
| 12,243,700 | B2 * | 3/2025 | Zhong | H01H 51/2209 | |
| 2016/0155592 | A1 * | 6/2016 | Ito | H01H 50/36 | 335/187 |
| 2021/0175031 | A1 * | 6/2021 | Yoo | H01H 33/596 | |

FOREIGN PATENT DOCUMENTS

| | | | | |
|---|---|---|---|---|
| JP | 2012199126 A | 10/2012 | | |
| JP | 2018133347 A | 8/2018 | | |
| KR | 20200000312 A | 1/2020 | | |
| KR | 20200025808 A | 3/2020 | | |
| KR | 20200096195 A | 8/2020 | | |
| WO | WO-2020045859 A1 * | 3/2020 | | H01H 51/065 |

OTHER PUBLICATIONS

Written Opinion for related International Application No. PCT/KR2021/015637; action dated Jun. 2, 2022; (9 pages).

Extended European Search Report for related European Application No. 21889497.0; action dated Sep. 11, 2024; (7 pages).

* cited by examiner (a)

(b)

MOVABLE CONTACT PART AND DIRECT CURRENT RELAY COMPRISING SAME

CROSS-REFERENCE TO RELATED APPLICATION

This application is a National Stage of International Application No. PCT/KR2021/015637, filed on Nov. 2, 2021, which claims priority to and the benefit of Korean Patent Application No. 10-2020-0146299, filed on Nov. 4, 2020, the disclosure of which is incorporated herein by reference in its entirety.

FIELD

The present disclosure relates to a movable contact part and a direct current relay including the same, and more specifically to a movable contact part having a structure which is capable of improving the operation reliability while improving the ability to reduce an electromagnetic repulsive force, and a direct current relay including the same.

BACKGROUND

A direct current (DC) relay is a device that transmits a mechanical drive or current signal using the principle of an electromagnet. A direct current relay is also called a magnetic switch, and it is generally classified as an electrical circuit switching device.

The direct current relay may be operated by receiving external control power. The direct current relay includes a fixed core and a movable core that can be magnetized by a control power supply. The fixed core and the movable core are positioned adjacent to a bobbin on which a plurality of coils are wound.

When the control power is applied, the plurality of coils form an electromagnetic field. The fixed core and the movable core are magnetized by the electromagnetic field, and electromagnetic attraction is generated between the fixed core and the movable core.

Since the fixed core is fixed, the movable core is moved toward the fixed core. One side of the shaft member is connected to the movable core. In addition, the other side of the shaft member is connected to the movable contact.

When the movable core is moved toward the fixed core, the shaft and the movable contact connected to the shaft are also moved, By this movement, the movable contact can be moved toward the fixed contact. When the movable contact and the fixed contact are in contact, the direct current relay is energized with an external power source and load.

Referring to FIGS. 1 and 2, the direct current relay 1000 according to the related art includes a frame part 1100, a contact part 1200, an actuator 1300 and a movable contact moving part 1400.

The frame part 1100 forms the outer shape of the direct current relay 1000. A predetermined space is formed inside the frame part 1100 to accommodate the contact part 1200, the actuator 1300 and the movable contact moving part 1400.

When control power is applied from the outside, the coil 1310 which is wound around the bobbin 1320 of the actuator 1300 generates an electromagnetic field. The fixed core 1330 and the movable core 1340 are magnetized by the electromagnetic field. The fixed core 1330 is moved toward a fixed bar, and the movable core 1340 and the movable shaft 1350 connected to the movable core 1340 are moved toward the fixed core 1330.

In this case, the movable shaft 1350 is also connected to the movable contact 1220 of the contact part 1200. Accordingly, by the movement of the movable core 1340, the movable contact 1220 and the fixed contact 1210 are in contact to conduct electricity.

When the application of the control power is released, the coil 1310 no longer forms an electromagnetic field. Accordingly, the electromagnetic attraction between the movable core 1340 and the fixed core 1330 disappears. As the movable core 1340 moves, the compressed spring 1360 is tensioned, and the movable core 1340 and the movable shaft 1350 and the movable contact 1220 connected thereto are moved downward.

The movable contact 1220 is coupled to the movable contact moving part 1400. The movable contact moving part 1400 is configured to move in the vertical direction according to the movement of the movable core 1340.

The movable contact moving part 400 includes a movable contact supporting part 1410 for supporting the movable contact 1220 and an elastic part 1430 for elastically supporting the movable contact 1220. In addition, the movable contact cover part 1420 is provided on the upper side of the movable contact 1220 to protect the movable contact 1220.

However, in the movable contact moving part 1400 according to the related art, the movable contact 1220 is only elastically supported by the elastic part 1430. That is, a separate member for preventing the movable contact 1220 from being separated from the movable contact moving part 1400 is not provided.

When the fixed contact 1210 and the movable contact 1220 are in contact, an electromagnetic repulsive force is generated as current flows. The repulsive force may act such that the movable contact 1220 is spaced apart from the fixed contact 1210.

In this case, even when the control power is applied, the direct current relay 1000 is not energized, which may cause malfunction or failure. In addition, there is a possibility that each component of the movable contact moving part 1400 is vibrated or separated by the electromagnetic repulsive force.

Korean Registered Patent No. 10-1943365 discloses a direct current relay which is capable of mitigating an impact occurring between a shaft and a plate. Specifically, it discloses a direct current relay provided with a tension spring which is fixed to the mounting part and the movable contact such that the tension spring is tensioned when the mounting part is moved.

However, this type of DC relay only suggests a method for mitigating an impact between the shaft and the plate, but does not suggest a method for forming a coupling state between the movable contact and the components that move the same.

Korean Registered Patent No. 10-1661396 discloses an electromagnetic relay which is capable of optimizing operating characteristics. Specifically, it discloses an electromagnetic relay that can achieve proper extinguishing without an increase in cost, by including a permanent magnet and an extension portion for maintaining the permanent magnet.

However, this type of electromagnetic relay also concentrates only on the arrangement structure of the permanent magnet, and does not present a method for forming a coupling state between the movable contact and the components that move the same.

Korean Registered Patent No. 10-1943365 (Jan. 29, 2019)

Korean Registered Patent No. 10-1661396 (Sep. 29, 2016)

SUMMARY

An object of the present disclosure is to provide a movable contact part having a structure which is capable of solving the above-described problems, and a direct current relay including the same.

First of all, an object of the present disclosure is to provide a movable contact part having a structure in which each component coupled to the movable contact can stably maintain a coupled state, and a direct current relay including the same.

In addition, another object of the present disclosure is to provide a movable contact part having a structure that is not shaken by vibration generated during the operation, and a direct current relay including the same.

In addition, still another object of the present disclosure is to provide a movable contact part having a structure in which each component constituting the movable contact part can be easily coupled, and a direct current relay including the same.

In addition, still another object of the present disclosure is to provide a movable contact part having a structure which is capable of reducing an additional member required for coupling the movable contact part, and a direct current relay including the same.

In addition, still another object of the present disclosure is to provide a movable contact part having a structure in which design diversity can be secured, and a direct current relay including the same.

In order to achieve the above objects, the present disclosure provides a movable contact part, including a movable contact which is in contact with or spaced apart from a fixed contact; an upper yoke which is located on one side of the movable contact, covers a portion of the movable contact and forms a magnetic force; and a shaft holder which is positioned between the movable contact and the upper yoke, wherein the upper yoke includes an upper groove which is formed to be recessed on one surface facing the shaft holder, and wherein the shaft holder includes a holder protrusion which is formed to protrude from one surface facing the upper yoke and inserted into the upper groove.

In addition, the upper groove and the holder protrusion of the movable contact part may be formed to have a circular cross-section.

In addition, the upper groove and the holder protrusion of the movable contact part may be formed to have a polygonal cross-section.

In addition, a plurality of upper grooves of the movable contact part may be formed, and the plurality of upper grooves may be spaced apart from each other, and wherein a plurality of holder protrusions may be formed, and the plurality of holder protrusions may be spaced apart from each other and disposed to correspond to the positions of the plurality of upper grooves.

In addition, the plurality of upper grooves of the movable contact part may be arranged symmetrically with respect to the center located inside the one surface of the upper yoke.

In addition, the plurality of upper grooves of the movable contact part may be arranged asymmetrically with respect to the center located inside the one surface of the upper yoke.

In addition, the shaft holder of the movable contact part may include a holder groove which is formed to be recessed on the other surface facing the movable contact, and wherein the movable contact may include a contact protrusion which is formed to protrude from one surface facing the shaft holder and inserted into the upper groove.

In addition, the holder groove and the contact protrusion of the movable contact part may be formed to have a circular cross-section.

In addition, the holder groove and the contact protrusion of the movable contact part may be formed to have a polygonal cross-section.

In addition, a plurality of holder grooves of the movable contact part may be formed, and the plurality of holder grooves may be spaced apart from each other, and wherein a plurality of contact protrusions may be formed, and the plurality of contact protrusions may be spaced apart from each other and disposed to correspond to the positions of the plurality of holder grooves.

In addition, the plurality of holder grooves of the movable contact part may be arranged symmetrically with respect to the center located inside the other surface of the shaft holder.

In addition, the plurality of holder grooves of the movable contact part may be arranged asymmetrically with respect to the center located inside the other surface of the shaft holder.

In addition, the movable contact part may further include a lower yoke which is located on the other side of the movable contact, supports the movable contact and forms a magnetic force, wherein the movable contact may include a contact groove which is formed to be recessed on a surface facing the lower yoke, and wherein the lower yoke may include a lower protrusion which is formed to protrude from one surface facing the movable contact and inserted into the contact groove.

In addition, the contact groove and the lower protrusion of the movable contact part may be formed to have a circular or polygonal cross-section.

In addition, a plurality of contact grooves of the movable contact part may be formed, and the plurality of contact grooves may be spaced apart from each other, and wherein a plurality of lower protrusions may be formed, and the plurality of lower protrusions may be spaced apart from each other and disposed to correspond to the positions of the plurality of contact grooves.

In addition, the plurality of contact grooves of the movable contact part may be arranged symmetrically with respect to the center located inside the surface facing the lower yoke.

In addition, the plurality of contact grooves of the movable contact part may be arranged asymmetrically with respect to the center located inside the surface facing the lower yoke.

In addition, the present disclosure provides a direct current relay, including a fixed contact which is energized with an external power source or load; and a movable contact part which is located below the fixed contact and moves in a direction toward the fixed contact and in a direction opposite to the fixed contact, wherein the movable contact part includes a movable contact which is in contact with or spaced apart from the fixed contact; an upper yoke which is located above the movable contact and covers the movable contact; a shaft holder which is positioned between the upper yoke and the movable contact, and covers the movable contact; and a lower yoke which supports the movable contact on the lower side of the movable contact, wherein the upper yoke and the lower yoke respectively form a magnetic force that attenuates an electromagnetic repulsive force generated between the fixed contact and the movable contact, wherein the upper yoke includes an upper groove which is formed to be recessed on a surface facing the shaft holder, wherein the shaft holder includes a holder protrusion which is formed to protrude from a surface facing the upper yoke and inserted into the upper groove, wherein the movable contact includes a contact groove which is formed to be recessed on a surface facing the lower yoke, and wherein the lower yoke includes a lower protrusion which is formed to protrude from a surface facing the movable contact and inserted into the contact groove.

In addition, the shaft holder of the direct current relay may include a holder groove which is formed to be recessed on a surface facing the movable contact, and wherein the movable contact may include a contact protrusion which is formed to protrude from a surface facing the shaft holder and inserted into the upper groove.

According to an exemplary embodiment of the present disclosure, the following effects can be achieved.

First of all, the movable contact part is provided with an upper yoke, a shaft holder, a movable contact and a lower yoke. The upper yoke, the shaft holder, the movable contact and the lower yoke are sequentially stacked from top to bottom.

In this case, the upper yoke is provided with an upper coupling part. The upper coupling part includes an upper groove which is formed to be recessed on the lower surface of the upper yoke, that is, the surface facing the shaft holder.

The shaft holder is provided with a holder coupling part. The holder coupling part includes a holder protrusion which is formed to protrude from the upper surface of the shaft holder, that is, the surface facing the upper yoke.

When the upper yoke is stacked on the shaft holder, the holder protrusion is inserted into the upper groove.

The movable contact is provided with a contact coupling part. The contact coupling part includes a contact groove which is formed to be recessed on the lower surface of the movable contact, that is, the surface facing the lower yoke.

The lower yoke is provided with a lower coupling part. The lower coupling part includes a lower protrusion which is formed to protrude from the upper surface of the lower yoke, that is, the surface facing the movable contact.

When the movable contact is stacked on the lower yoke, the lower protrusion is inserted into the contact groove.

In an exemplary embodiment, the holder coupling part includes a holder groove which is formed to be recessed in the lower surface of the shaft holder, that is, the surface facing the movable contact.

In the above exemplary embodiment, the contact coupling part includes a contact protrusion which is formed to protrude from the upper surface of the movable contact, that is, the surface facing the shaft holder.

When the shaft holder is stacked on the movable contact, the contact protrusion is inserted into the holder groove.

Accordingly, the respective components constituting the movable contact part are coupled to each other by the respective engaging parts. Accordingly, even when the direct current relay is operated and vibration is generated, the respective components constituting the movable contact part may be maintained in a negatively coupled state without fluctuation.

In addition, each coupling part is coupled to each other in such a way that the protrusion is inserted into the groove. Therefore, separate equipment is not required to combine each component. Further, in an exemplary embodiment, each coupling part is disposed on the same axis in the stacking direction thereof.

Accordingly, the respective components constituting the movable contact part can be easily and firmly coupled to each other.

In addition, the components constituting the movable contact part can be stably coupled by each coupling part.

Therefore, an additional member for coupling each component constituting the movable contact part is not required. As a result, it is possible to reduce the unit cost for manufacturing a movable contact part and a direct current relay including the same.

Further, in various exemplary embodiments, the number, shape and arrangement method of the coupling parts may be variously configured. For example, the coupling part may have a circular or polygonal cross-section, and may be formed in single or plurality, and it may be disposed symmetrically or asymmetrically with respect to a specific direction or center.

Accordingly, design diversity can be secured, and various design changes are possible according to situations in which the direct current relay is used. Accordingly, the versatility of a movable contact part and a direct current relay including the same may be improved.

DETAILED DESCRIPTION

Hereinafter, the movable contact part 40 and the direct current relay 1 including the same according to an exemplary embodiment of the present disclosure will be described in detail with reference to the accompanying drawings.

In the following description, in order to clarify the characteristics of the present disclosure, the descriptions of some components may be omitted.

1. Definition of Terms

When a component is referred to as being “connected to” or “joined with” another component, it may be directly connected to or joined with the other component, but it will be understood that other components may exist in between.

On the other hand, when it is mentioned that a certain component is “directly connected to” or “directly joined with” another component, it will be understood that no other component is present in the middle.

As used herein, the singular expression includes the plural expression unless the context clearly dictates otherwise.

As used herein, the term “magnetize” refers to a phenomenon in which an object becomes magnetic in a magnetic field.

As used herein, the term “electric current” refers to a state in which two or more members are electrically connected.

Figure 3:
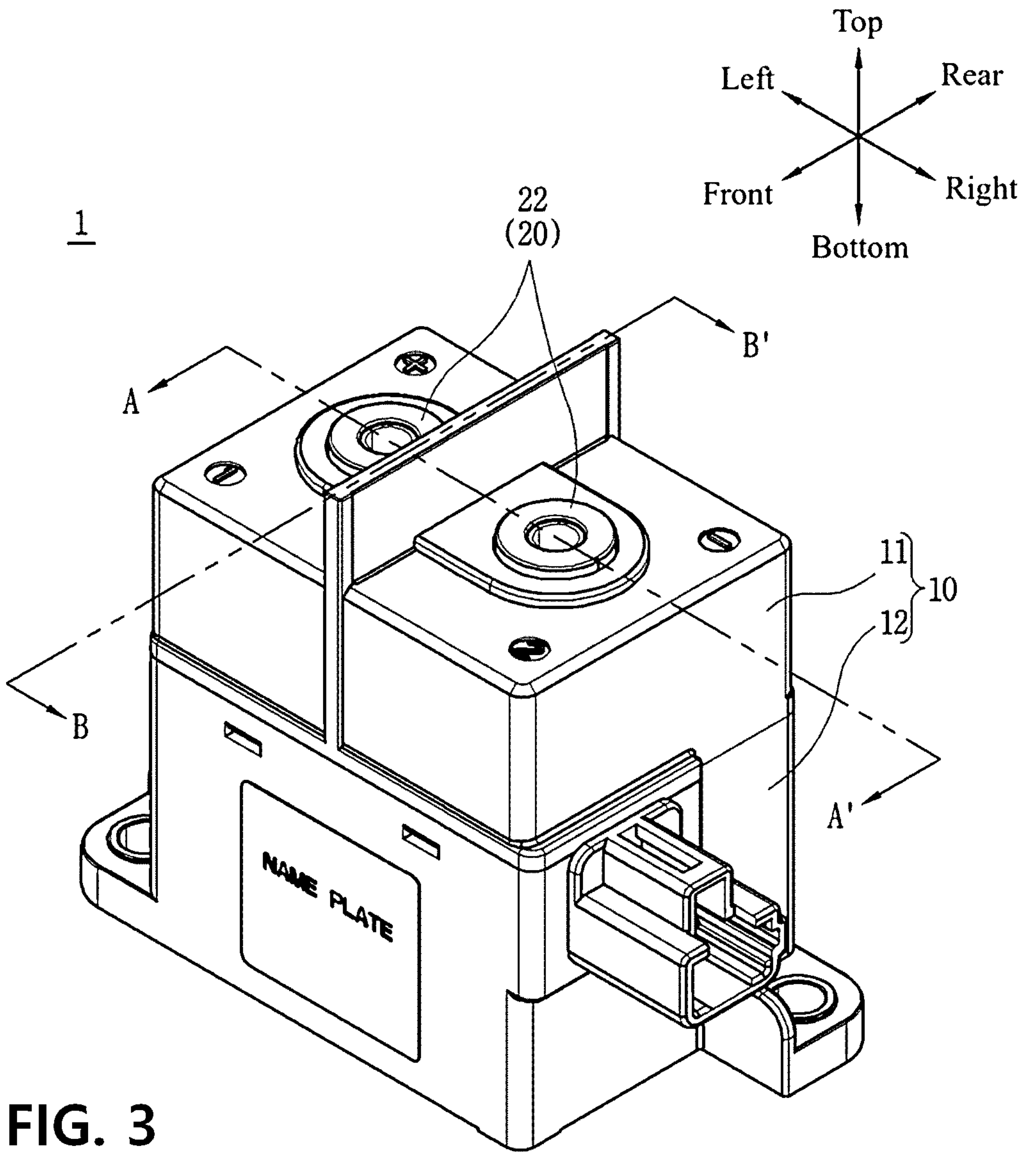
FIG. 3 is a perspective view illustrating a direct current relay according to an exemplary embodiment of the present disclosure.
Figure 6:
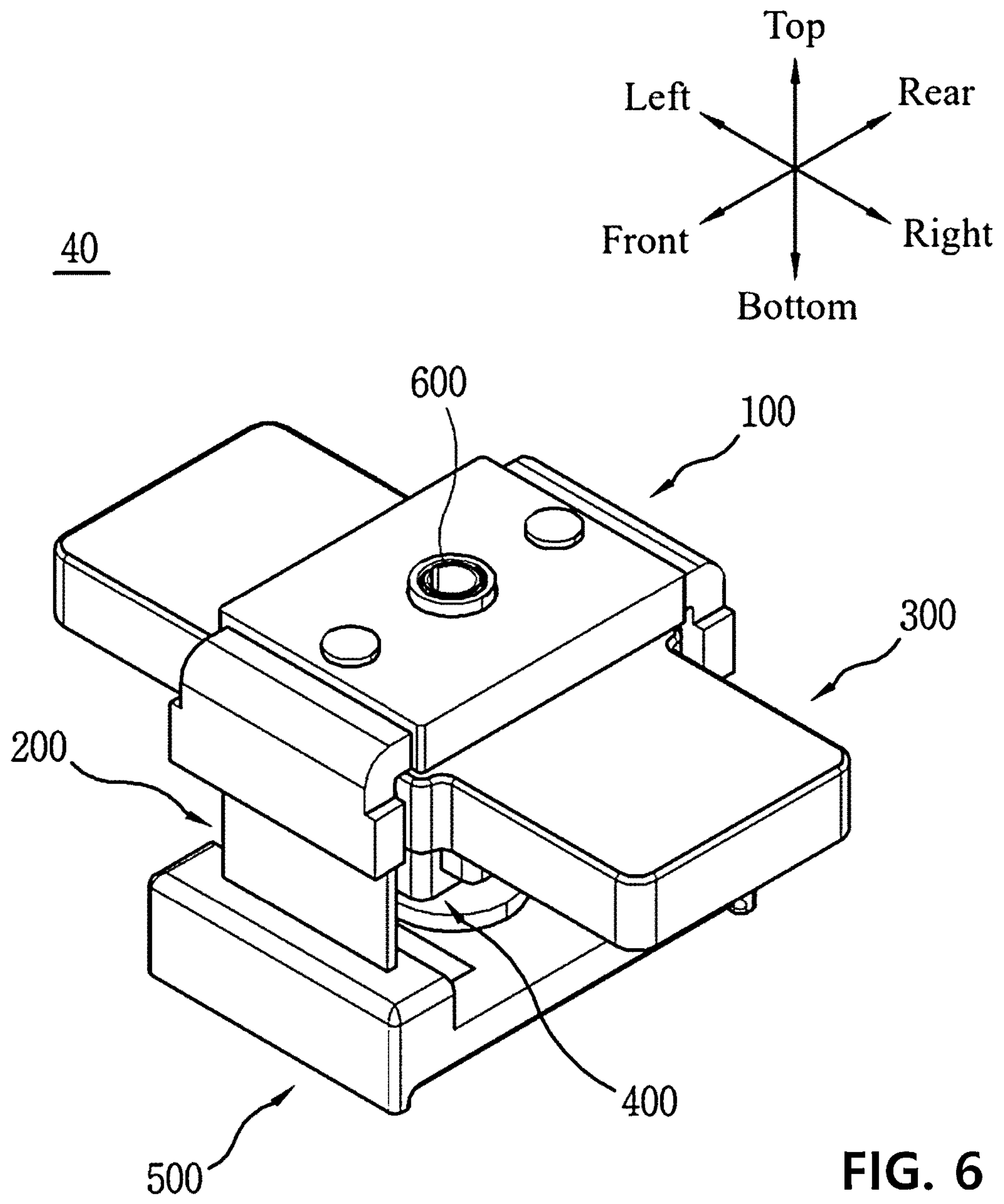
FIG. 6 is a perspective view illustrating a movable contact part according to an exemplary embodiment of the present disclosure.
Figure 7:
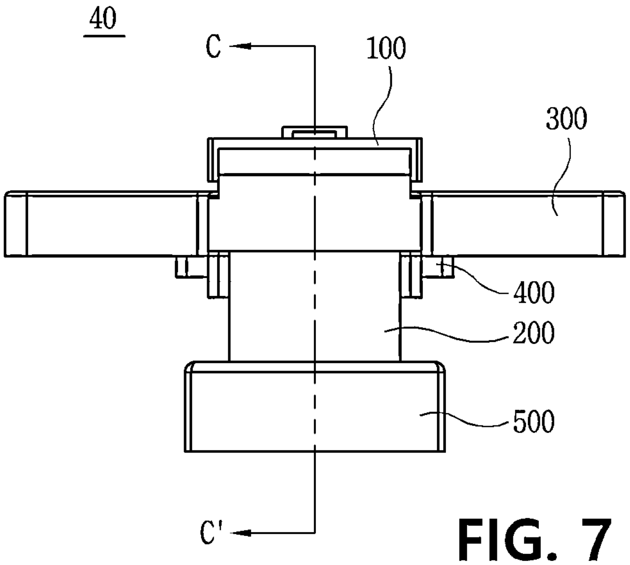
FIG. 7 is a front view showing the movable contact part of FIG. 6.

As used herein, the terms “left”, “right”, “top”, “bottom”, “front side” and “rear side” will be understood with reference to the coordinate systems illustrated in FIGS. 3 and 6.

Figure 4:
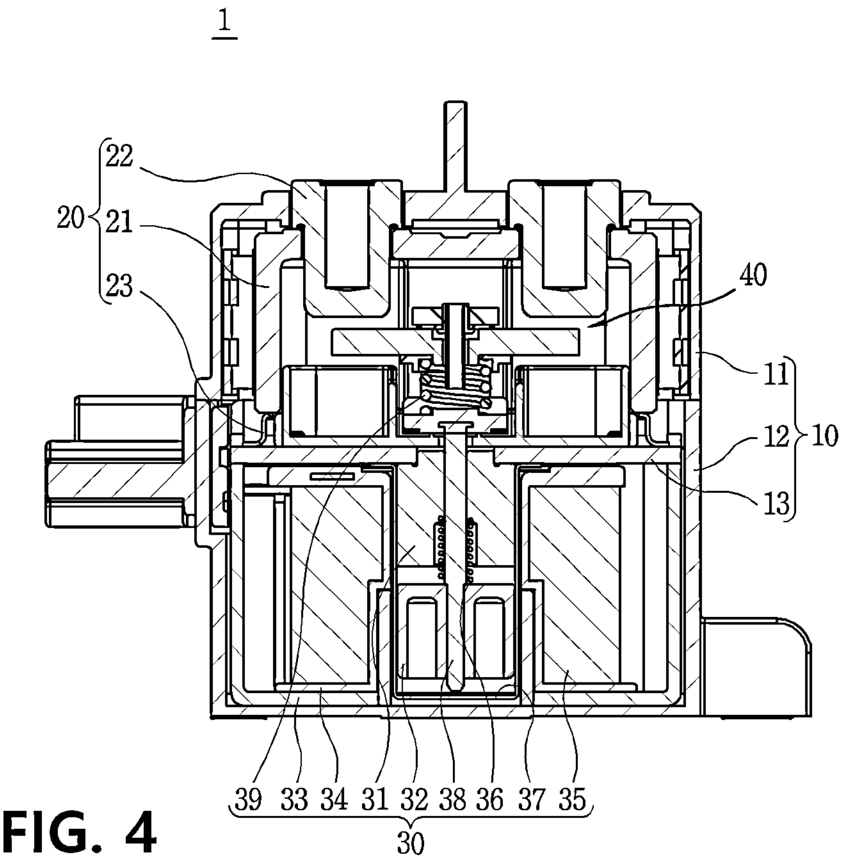
FIG. 4 is a cross-sectional view taken along line A-A' showing the configuration of the direct current relay of FIG. 3.
Figure 5:
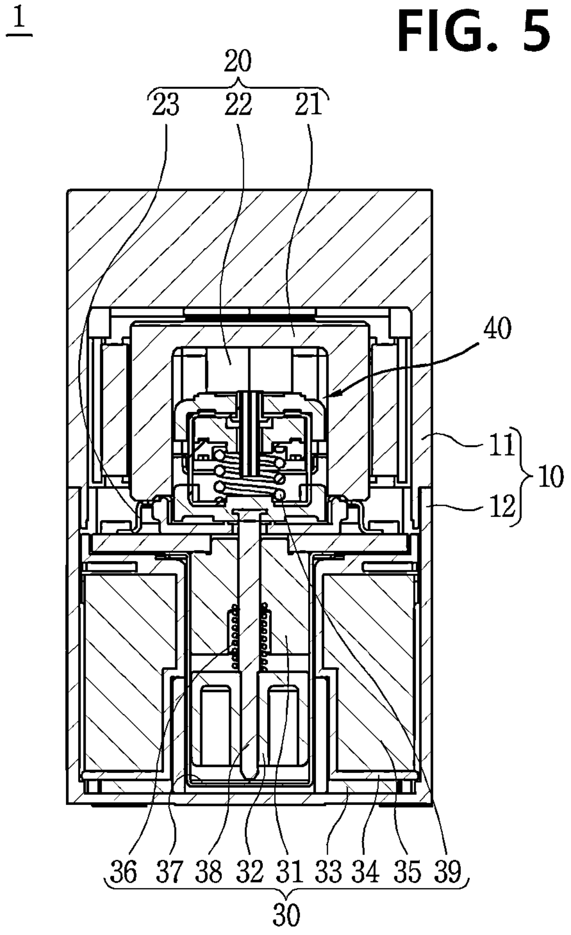
FIG. 5 is a sectional view taken along line B-B' showing the configuration of the direct current relay of FIG. 3.

2. Description of the Configuration of the Direct Current Relay 1 According to an Exemplary Embodiment of the Present Disclosure Referring to FIGS. 3 to 5, the direct current relay 1 according to an exemplary embodiment of the present disclosure includes a frame part 10, an opening/closing part 20 and a core part 30.

In addition, referring to FIGS. 6 to 38, the direct current relay 1 according to an exemplary embodiment of the present disclosure includes a movable contact part 40.

The movable contact part 40 according to an exemplary embodiment of the present disclosure may have an improved ability to reduce electromagnetic repulsive force by changing the structure and shape. At the same time, the movable contact part 40 according to an exemplary embodiment of the present disclosure may also improve the operational reliability.

Hereinafter, each configuration of the direct current relay 1 according to an exemplary embodiment of the present disclosure will be described with reference to the accompanying drawings, but the movable contact part 40 will be described in a separate section.

(1) Description of the Frame Part 10

The frame part 10 forms the outside of the direct current relay 1. A predetermined space is formed inside the frame part 10. Various devices that perform functions for the direct current relay 1 to apply or block an externally transmitted current may be accommodated in the space.

That is, the frame part 10 functions as a type of housing.

The frame part 10 may be formed of an insulating material such as synthetic resin. This is to prevent arbitrarily energizing the inside and outside of the frame part 10.

In the illustrated exemplary embodiment, the frame part 10 includes an upper frame 11, a lower frame 12 and a support plate 13.

The upper frame 11 forms the upper side of the frame part 10. A predetermined space is formed inside the upper frame 11. The space communicates with a space formed inside the lower frame 12.

The opening/closing part 20 and the movable contact part 40 may be accommodated in the inner space of the upper frame 11.

The upper frame 11 may be coupled to the lower frame 12. A support plate 13 may be provided in a space between the upper frame 11 and the lower frame 12.

The fixed contact 22 of the opening and closing unit 20 is positioned on one side of the upper frame 11, which is the upper side in the illustrated exemplary embodiment. A portion of the fixed contact 22 is exposed on the upper side of the upper frame 11, and it may be connected to an external power source or a load to be energized.

To this end, a through-hole through which the fixing contact 22 is coupled may be formed on the upper side of the upper frame 11.

The lower frame 12 forms the lower side of the frame part 10. A predetermined space is formed inside the lower frame 12. The core part 30 may be accommodated in the inner space of the lower frame 12. The space communicates with a space formed inside the upper frame 11.

The lower frame 12 may be coupled to the upper frame 11. A support plate 13 may be provided in a space between the lower frame 12 and the upper frame 11.

The support plate 13 is positioned between the upper frame 11 and the lower frame 12.

The support plate 13 physically separates the upper frame 11 and the lower frame 12 from each other.

The support plate 13 may be formed of a magnetic material. Accordingly, the support plate 13 may form a magnetic circuit together with the yoke 33 of the core part 30. By the magnetic circuit, a driving force for moving the movable core 32 toward the fixed core 31 may be formed.

A through-hole (not illustrated) is formed in the center of the support plate 13. A shaft 38 is coupled through the through-hole (not illustrated) to be movable in the vertical direction.

Therefore, when the movable core 32 is moved in a direction toward the fixed core 31 or in a direction spaced apart from the fixed core 31, the shaft 38 and the movable contact part 40 connected to the shaft 38 may also be moved together in the same direction.

(2) Description of the Opening/Closing Part 20

The opening/closing part 20 permits or blocks current flow according to the operation of the core part 30. Specifically, the fixed contact 22 and the movable contact 300 are contacted or spaced apart by the opening/closing part 20 to allow or block current flow.

The opening/closing part 20 is accommodated in the inner space of the upper frame 11. The opening/closing part 20 may be electrically and physically spaced apart from the core part and the movable core 32 by the support plate 13.

In the illustrated exemplary embodiment, the opening/closing part 20 includes an arc chamber 21, a fixed contact 22 and a sealing member 23.

Although not illustrated, a magnet member for forming an arc path may be provided outside the arc chamber 21. The magnet member may generate a magnetic field inside the arc chamber 21 to generate an electromagnetic force that forms a path of the generated arc.

The arc chamber 21 extinguishes an arc generated by the fixed contact 22 and the movable contact 300 being spaced apart from each other in the inner space. Accordingly, the arc chamber 21 may be referred to as an "arc extinguishing unit."

The arc chamber 21 hermetically accommodates the fixed contact 22 and the movable contact 300. That is, the fixed contact 22 and the movable contact 300 are accommodated in the arc chamber 21. Accordingly, the arc generated by the fixed contact 22 and the movable contact 300 being spaced apart does not flow out arbitrarily to the outside.

The arc chamber 21 may be filled with an extinguishing gas. The extinguishing gas allows the generated arc to be extinguished and discharged to the outside of the direct current relay 1 through a preset path. To this end, a communication hole (not illustrated) may be formed through the wall surrounding the inner space of the arc chamber 21.

The arc chamber 21 may be formed of an insulating material. In addition, the arc chamber 21 may be formed of a material having high pressure resistance and high heat resistance. This is because the generated arc is a flow of high-temperature and high-pressure electrons. In an exemplary embodiment, the arc chamber 21 may be formed of a ceramic material.

A plurality of through-holes may be formed on the upper side of the arc chamber 21. A fixed contact 22 is through-coupled to each of the through-holes.

In the illustrated exemplary embodiment, the fixed contact 22 is provided in two, including a first fixed contact on the left side and a second fixed contact on the right side. Accordingly, two through-holes formed on the upper side of the arc chamber 21 may also be formed.

When the fixed contact 22 is through-coupled to the through-hole, the through-hole is sealed. That is, the fixed contact 22 is hermetically coupled to the through-hole. Accordingly, the generated arc is not discharged to the outside through the through-hole.

The lower side of the arc chamber 21 may be open. The sealing member 23 is in contact with the lower side of the arc chamber 21. That is, the lower side of the arc chamber 21 is sealed by the sealing member 23.

Accordingly, the arc chamber 21 may be electrically and physically spaced apart from the outer space of the upper frame 11.

The arc extinguished in the arc chamber 21 is discharged to the outside of the direct current relay 1 through a preset path. In an exemplary embodiment, the extinguished arc may be discharged to the outside of the arc chamber 21 through the communication hole (not illustrated).

The fixed contact 22 is in contact with or spaced apart from the movable contact 300 to apply or cut off electric current inside and outside the direct current relay 1.

Specifically, when the fixed contact 22 is in contact with the movable contact 300, the inside and the outside of the direct current relay 1 may be energized. On the other hand, when the fixed contact 22 is spaced apart from the movable contact 300, electric current inside and outside the direct current relay 1 is cut off.

As the name implies, the fixed contact 22 is not moved. That is, the fixed contact 22 is fixedly coupled to the upper frame 11 and the arc chamber 21. Therefore, the contact and separation of the fixed contact 22 and the movable contact 300 are achieved by the movement of the movable contact 300.

One end of the fixed contact 22, which is the upper end in the illustrated exemplary embodiment, is exposed to the outside of the upper frame 11. A power source or a load is connected to the one end to be energized, respectively.

A plurality of fixed contacts 22 may be provided. In the illustrated exemplary embodiment, the fixed contact 22 includes a first fixed contact on the left side and a second fixed contact on the right side, and there are two fixed contacts.

The first fixed contact is located to be biased to one side from the center in the longitudinal direction of the movable contact 300, which is the left side in the illustrated exemplary embodiment. In addition, the second fixed contact is located to be biased to the other side from the center in the longitudinal direction of the movable contact 300, which is the right side in the illustrated exemplary embodiment.

Power may be energably connected to any one of the first fixed contact and the second fixed contact. In addition, a load may be electrically connected to the other one of the first fixed contact and the second fixed contact.

The other end of the fixed contact 22, which is the lower end in the illustrated exemplary embodiment, extends toward the movable contact 300.

When the movable contact 300 is moved in a direction toward the fixed contact 22, which is upward in the illustrated exemplary embodiment, the lower end is in contact with the movable contact 300. Accordingly, the outside and the inside of the direct current relay 1 may be energized.

The lower end of the fixed contact 22 is located inside the arc chamber 21.

When the control power is cut off, the movable contact 300 is spaced apart from the fixed contact 22 by the elastic force of the return spring 36 of the core part 30.

In this case, as the fixed contact 22 and the movable contact 300 are spaced apart, an arc is generated between the fixed contact 22 and the movable contact 300. The generated arc is extinguished by the extinguishing gas inside the arc chamber 21 and may be discharged to the outside.

The sealing member 23 blocks any communication between the arc chamber 21 and the space inside the upper frame 11. The sealing member 23 seals the lower side of the arc chamber 21 together with the support plate 13.

Specifically, the upper side of the sealing member 23 is coupled to the lower side of the arc chamber 21. In addition, the radially inner side of the sealing member 23 is coupled to the outer periphery of the insulating plate (not illustrated), and the lower side of the sealing member 23 is coupled to the support plate 13.

Accordingly, the arc generated in the arc chamber 21 and the arc extinguished by the extinguishing gas do not flow into the inner space of the upper frame 11.

In addition, the sealing member 23 may block any communication between the inner space of the cylinder 37 and the inner space of the frame part 10.

(3) Description of the Core Part 30

The core part 30 moves the movable contact part 40 upward according to the application of the control power. In addition, when the application of the control power is released, the core part 30 moves the movable contact part 40 downward again.

The core part 30 may be connected to an external control power supply (not illustrated) so as to be energized, and may receive control power supply.

The core part 30 is located below the opening/closing part 20. In addition, the core part 30 is accommodated in the lower frame 12. The core part 30 and the opening/closing part 20 may be electrically and physically spaced apart from each other by an insulating plate (not illustrated) and a support plate 13.

A movable contact part 40 is positioned between the core part 30 and the opening/closing part 20. The movable contact part 40 may be moved by the driving force applied by the core part 30. Accordingly, the movable contact 300 and the fixed contact 22 may be in contact such that the direct current relay 1 may be energized.

In the illustrated exemplary embodiment, the core part 30 includes a fixed core 31, a movable core 32, a yoke 33, a bobbin 34, a coil 35, a return spring 36, a cylinder 37, a shaft 38 and an elastic member 39.

Figure 1:
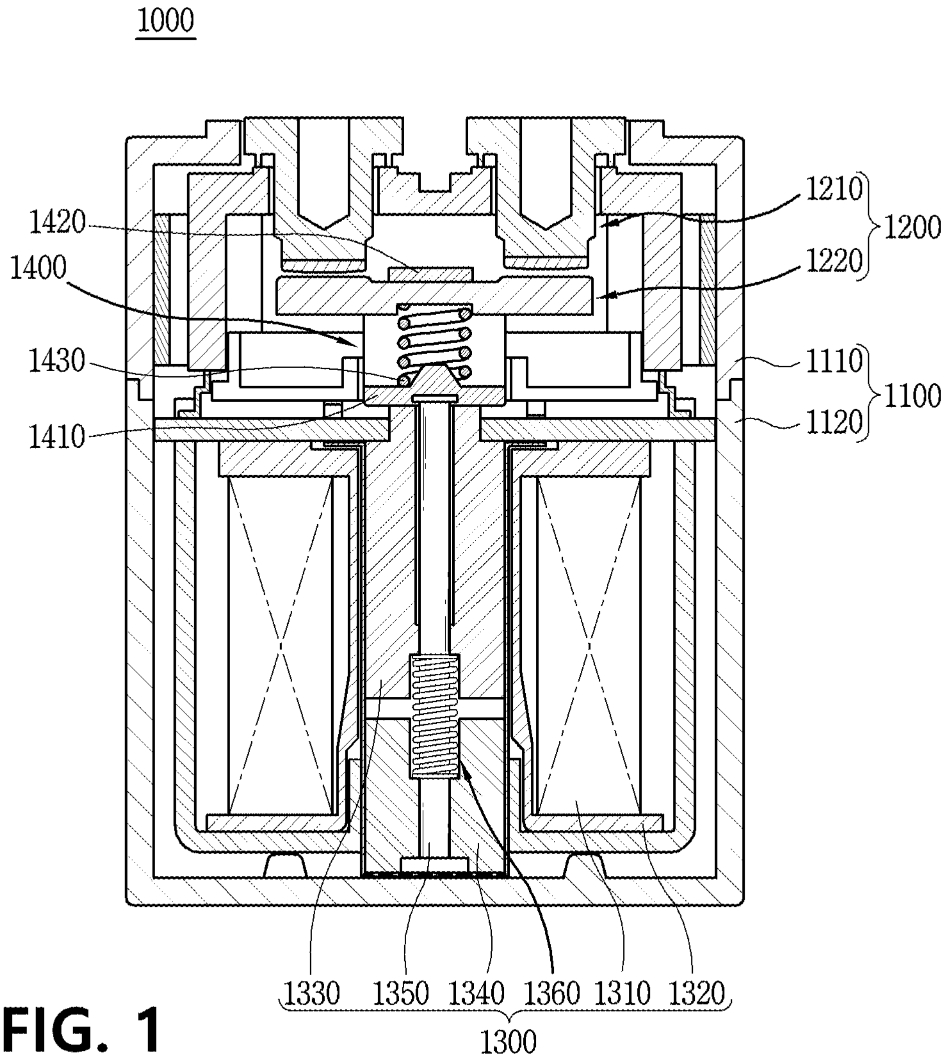
FIG. 1 PRIOR ART
FIG. 1 is a cross-sectional view of a direct current relay according to the related art.
Figure 2:
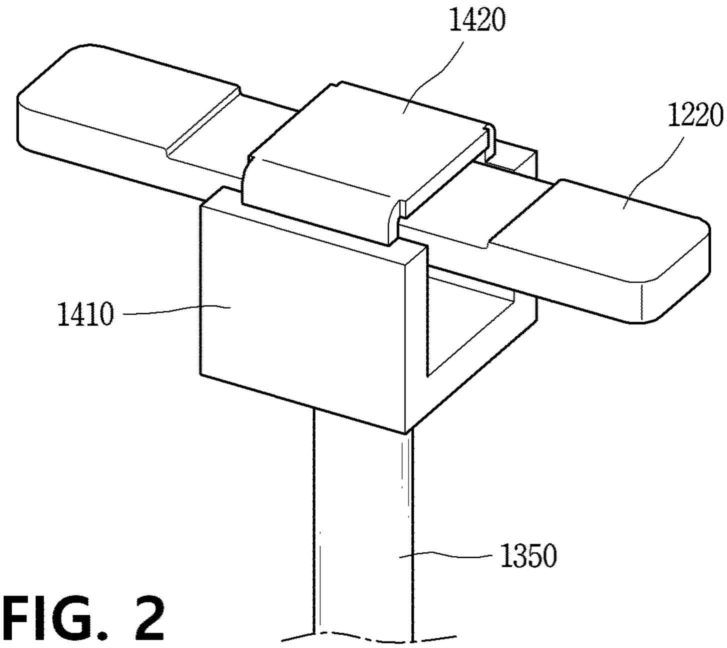
FIG. 2 PRIOR ART
FIG. 2 is a perspective view of a movable contact moving part provided in the direct current relay of FIG. 1.

The fixed core 31 is magnetized by the magnetic field generated by the coil 35 to generate electromagnetic attraction. By the electromagnetic attraction, the movable core 32 is moved toward the fixed core 31 (upward direction in FIGS. 2 and 3).

The fixed core 31 does not move. That is, the fixed core 31 is fixedly coupled to the support plate 13 and the cylinder 37.

The fixed core 31 may be provided in any shape capable of generating electromagnetic force by being magnetized by a magnetic field. In an exemplary embodiment, the fixed core 31 may be formed of a magnetic material, or may be provided with a permanent magnet or an electromagnet.

The fixed core 31 is partially accommodated in the upper space inside the cylinder 37. In addition, the outer periphery of the fixed core 31 is in contact with the inner periphery of the cylinder 37.

The fixed core 31 is positioned between the support plate 13 and the movable core 32.

A through-hole (not illustrated) is formed in the central portion of the fixed core 31. A shaft 38 is through-coupled to the through-hole (not illustrated) so as to be movable up and down.

The fixed core 31 is positioned to be spaced apart from the movable core 32 by a predetermined distance. Accordingly, the distance at which the movable core 32 can be moved toward the fixed core 31 may be limited to the predetermined distance. Accordingly, the predetermined distance may be defined as "a moving distance of the movable core 32."

One end of the return spring 36, which is the upper end in the illustrated exemplary embodiment, is in contact with the lower side of the fixed core 31. When the fixed core 31 is magnetized and the movable core 32 is moved upward, the return spring 36 is compressed and a restoring force is stored.

Accordingly, when the application of the control power is released and the magnetization of the fixed core 31 is terminated, the movable core 32 may be returned to the lower side by the restoring force.

The movable core 32 is moved toward the fixed core 31 by electromagnetic attraction generated by the fixed core 31 when control power is applied.

As the movable core 32 moves, the shaft 38 coupled to the movable core 32 moves upward in a direction toward the fixed core 31, which is the upper side in the illustrated exemplary embodiment. In addition, as the shaft 38 moves, the movable contact part 40 coupled to the shaft 38 moves upward.

Accordingly, the fixed contact 22 and the movable contact 300 may be in contact such that the direct current relay 1 may be energized with an external power source or load.

The movable core 32 may be provided in any shape capable of receiving attractive force by electromagnetic force. In an exemplary embodiment, the movable core 32 may be formed of a magnetic material, or may be provided with a permanent magnet or an electromagnet.

The movable core 32 is accommodated inside the cylinder 37. In addition, the movable core 32 may be moved in the height direction of the cylinder 37 inside the cylinder 37, which is the vertical direction in the illustrated exemplary embodiment.

Specifically, the movable core 32 may be moved in a direction toward the fixed core 31 and in a direction away from the fixed core 31.

The movable core 32 is coupled to the shaft 38. The movable core 32 may move integrally with the shaft 38. When the movable core 32 moves upward or downward, the shaft 38 also moves upward or downward. Accordingly, the movable contact 300 is also moved upward or downward.

The movable core 32 is located below the fixed core 31. The movable core 32 is spaced apart from the fixed core 31 by a predetermined distance. As described above, the predetermined distance is a distance at which the movable core 32 can be moved in the vertical direction.

In the illustrated exemplary embodiment, the movable core 32 has a circular cross-section, and has a cylindrical shape extending in one direction, which is the vertical direction in the illustrated exemplary embodiment. The movable core 32 may be of any shape that is vertically accommodated in the cylinder 37 and may be moved in a direction toward the fixed core 31 or in a direction opposite to the fixed core 31.

The yoke 33 forms a magnetic circuit as control power is applied. The magnetic circuit formed by the yoke 33 may control the direction of the magnetic field formed by the coil 35.

Accordingly, when control power is applied, the coil 35 may generate a magnetic field in a direction where the movable core 32 moves toward the fixed core 31. The yoke 33 may be formed of a conductive material capable of conducting electricity.

The yoke 33 is accommodated inside the lower frame 12. The yoke 33 surrounds the coil 35. The coil 35 may be accommodated in the yoke 33 so as to be spaced apart from the inner circumferential surface of the yoke 33 by a predetermined distance.

The bobbin 34 is accommodated inside the yoke 33. That is, from the outer periphery of the lower frame 12 to the radially inward direction, the yoke 33, the coil 35 and the bobbin 34 on which the coil 35 is wound are sequentially arranged.

The upper side of the yoke 33 is in contact with the support plate 13. In addition, the outer periphery of the yoke 33 may be positioned to be in contact with the inner periphery of the lower frame 12 or to be spaced apart from the inner periphery of the lower frame 12 by a predetermined distance.

A coil 35 is wound around the bobbin 34. The bobbin 34 is accommodated inside the yoke 33.

The bobbin 34 may include flat upper and lower portions, and a cylindrical column portion extending in the longitudinal direction to connect the upper and lower portions. That is, the bobbin 34 has a bobbin shape.

The upper portion of the bobbin 34 is in contact with the lower side of the support plate 13. A coil 35 is wound around the column portion of the bobbin 34. The thickness around which the coil 35 is wound may be the same as or smaller than the diameters of the upper and lower portions of the bobbin 34.

A hollow portion extending in the longitudinal direction is formed through the column portion of the bobbin 34. A cylinder 37 may be accommodated in the hollow portion. The column portion of the bobbin 34 may be disposed to have the same central axis as the fixed core 31, the movable core 32 and the shaft 38.

The coil 35 generates a magnetic field by the applied control power. The fixed core 31 is magnetized by the magnetic field generated by the coil 35, and electromagnetic attraction may be applied to the movable core 32.

The coil 35 is wound around a bobbin 34. Specifically, the coil 35 is wound on the column portion of the bobbin 34, and is stacked radially outward of the column portion. The coil 35 is accommodated inside the yoke 33.

When the control power is applied, the coil 35 generates a magnetic field. In this case, the strength or direction of the magnetic field generated by the coil 35 may be controlled by the yoke 33. The fixed core 31 is magnetized by the magnetic field generated by the coil 35.

When the fixed core 31 is magnetized, the movable core 32 receives an electromagnetic force in a direction toward the fixed core 31, that is, an attractive force. Accordingly, the movable core 32 is moved upward in a direction toward the fixed core 31, which is the upper side in the illustrated exemplary embodiment.

The return spring 36 elastically supports the movable core 32 and the fixed core 31. The return spring 36 is positioned between the movable core 32 and the fixed core 31.

The return spring 36 is in contact with the movable core 32. Specifically, one end of the return spring 36 facing the movable core 32, which is the lower end in the illustrated exemplary embodiment, is in contact with the upper surface of the movable core 32.

The other end of the return spring 36 facing the fixed core 31, which is the upper end in the illustrated exemplary embodiment, is accommodated inside the fixed core 31. That is, in the illustrated exemplary embodiment, the return spring 36 is partially accommodated in a hollow portion formed radially outside the central axis of the fixed core 31. The upper end of the return spring 36 is in contact with one surface of the fixed core 31 surrounding the hollow portion of the fixed core 31 from the upper side.

The return spring 36 is deformed in shape and may be provided in any form capable of storing elastic force (i.e., restoring force) and transmitting the stored elastic force to another member. In the illustrated exemplary embodiment, the return spring 36 is provided in the form of a coil spring extending in the vertical direction and having a hollow portion formed therein.

The return spring 36 is coupled to the shaft 38. Specifically, the shaft 38 is through-coupled to the hollow portion formed inside the return spring 36.

When the movable core 32 is raised toward the fixed core 31, the return spring 36 is compressed between the movable core 32 and the fixed core 31 and stores the elastic force. When the current applied to the coil 35 is cut off and the movable core 32 is switched to a non-magnetized state, the return spring 36 is tensioned and lowers the movable core 32.

The cylinder 37 accommodates the fixed core 31, the movable core 32, the return spring 36 and the shaft 38. The movable core 32 and the shaft 38 may move upward and downward in the cylinder 37.

The cylinder 37 is located in a hollow portion formed in the column portion of the bobbin 34. The upper end of the cylinder 37 is in contact with the lower side surface of the support plate 13.

The side surface of the cylinder 37 is in contact with the inner peripheral surface of the column portion of the bobbin 34. The upper opening of the cylinder 37 may be sealed by the fixed core 31.

The lower side surface of the cylinder 37 may be in contact with the inner surface of the lower frame 12. The distance at which the movable core 32 moves in the downward direction may be limited by the contact.

The shaft 38 is coupled to the movable core 32 and the movable contact part 40, respectively. The shaft 38 transmits the raising and lowering of the movable core 32 to the movable contact part 40. Accordingly, when the movable core 32 is raised toward the fixed core 31, the shaft 38 and other components of the movable contact part 40 are also raised together.

As a result, the movable contact 300 and the fixed contact 22 come into contact such that the direct current relay 1 may be electrically connected to an external power source or load.

The shaft 38 is formed to extend between the movable contact part 40 and the movable core 32. In the illustrated exemplary embodiment, the shaft 38 has one side facing the movable contact part 40, which is the upper end thereof in the illustrated exemplary embodiment, coupled to the movable contact part 40.

In addition, the other side of the shaft 38 facing the movable core 32, which is the lower end in the illustrated exemplary embodiment, is through-coupled to the movable core 32. In the illustrated exemplary embodiment, the shaft 38 has a circular cross-section and has a cylindrical shape extending in the vertical direction.

The shaft 38 may be divided into a plurality of portions according to the size of the member and diameter to be coupled. In the illustrated exemplary embodiment, the shaft 38 is coupled to the movable contact part 40 and coupled to a head portion having a relatively larger diameter and the movable core 32, and may be divided into to the remaining portions having a relatively smaller diameter.

The shaft 38 and the movable core 32 may be fixedly coupled. In an exemplary embodiment, the shaft 38 and the movable core 32 may be welded together.

In addition, the shaft 38 and the movable contact part 40 may be fixedly coupled. In the illustrated exemplary embodiment, the head portion of the shaft 38 is inserted and coupled to the space inside the holder coupling part 500 of the movable contact part 40.

The elastic member 39 elastically supports the movable contact 300. When the core part 30 is operated to bring the movable contact 300 into contact with the fixed contact 22, an electrical repulsive force may be generated between the movable contact 300 and the fixed contact 22.

In this case, the elastic member 39 elastically supports the movable contact 300 from the lower side. Accordingly, any separation between the movable contact 300 and the fixed contact 22 may be prevented in spite of the electrical repulsive force.

The elastic member 39 may be provided in any shape capable of storing a restoring force by a change in shape and transmitting the stored restoring force to other components. In the illustrated exemplary embodiment, the elastic member 39 is provided as a coil spring. Further, in the illustrated exemplary embodiment, the elastic member 39 extends between the movable contact 300 and the holder coupling part 500, that is, in the vertical direction.

The elastic member 39 is located below the movable contact 300. The upper end of the elastic member 39 is in contact with the lower surface of the movable contact 300. The lower end of the elastic member 39 is in contact with the upper surface of the holder coupling part 500.

The elastic member 39 is accommodated in a space surrounded by the movable contact 300, the shaft holder 200 and the holder coupling part 500. Specifically, the upper side of the elastic member 39 is wrapped around the movable contact 300 and the shaft holder 200. In addition, the outer periphery of the elastic member 39, that is, the front and rear sides in the illustrated exemplary embodiment is surrounded by the shaft holder 200. Furthermore, the lower side of the elastic member 39 is surrounded by the holder coupling part 500.

A hollow portion is formed inside the elastic member 39. The hollow portion is formed to penetrate in a direction in which the elastic member 39 extends, which is the vertical direction in the illustrated exemplary embodiment. A support rod 600 is inserted through the hollow portion.

Accordingly, the elastic member 39 is not arbitrarily separated from the space surrounded by the shaft holder 200, the movable contact 300 and the holder coupling part 500 by the support rod 600.

3. Description of the Movable Contact Part 40 According to an Exemplary Embodiment of the Present Disclosure Referring again to FIGS. 4 and 5, the direct current relay 1 according to an exemplary embodiment of the present disclosure includes a movable contact part 40.

The movable contact part 40 is raised and lowered in a direction toward the fixed contact 22 or in a direction opposite to the fixed contact 22 by the operation of the above-described core part 30. Accordingly, the direct current relay 1 may be energized with an external power source or load, or energized may be cut off.

In particular, the movable contact part 40 according to an exemplary embodiment of the present disclosure stably maintains the contact state between the fixed contact 22 and the movable contact 300 through the structural change of the upper yoke 100 and the lower yoke 400.

Specifically, when the core part 30 is operated and the fixed contact 22 and the movable contact 300 come into contact, an electromagnetic repulsive force is generated between the two contacts 22, 300 by the energized current. In this case, the upper yoke 100 and the lower yoke 400 generate a magnetic force that attenuates the electromagnetic repulsive force, respectively.

The movable contact part 40 according to an exemplary embodiment of the present disclosure may secure the operational reliability of the movable contact part 40 while maximizing the magnetic force for attenuating the electromagnetic repulsive force.

In addition, the movable contact part 40 according to an exemplary embodiment of the present disclosure may stably maintain the formed coupling state. This is achieved by coupling parts 130, 230, 330, 430 provided in each component to be described below.

Hereinafter, the movable contact part 40 according to an exemplary embodiment of the present disclosure will be described in detail with reference to FIGS. 6 to 38.

In the exemplary embodiment illustrated in FIGS. 6 to 9, the movable contact part 40 includes an upper yoke 100, a shaft holder 200, a movable contact 300, a lower yoke 400, a holder coupling part 500 and a support rod 600.

Further, in the illustrated exemplary embodiment, the upper yoke 100, the shaft holder 200, the movable contact 300, the lower yoke 400 and the holder coupling part 500 are sequentially stacked from the top to the bottom.

In addition, the support rod 600 is through-coupled to the upper yoke 100, the shaft holder 200, the movable contact 300 and the lower yoke 400.

Figure 8:
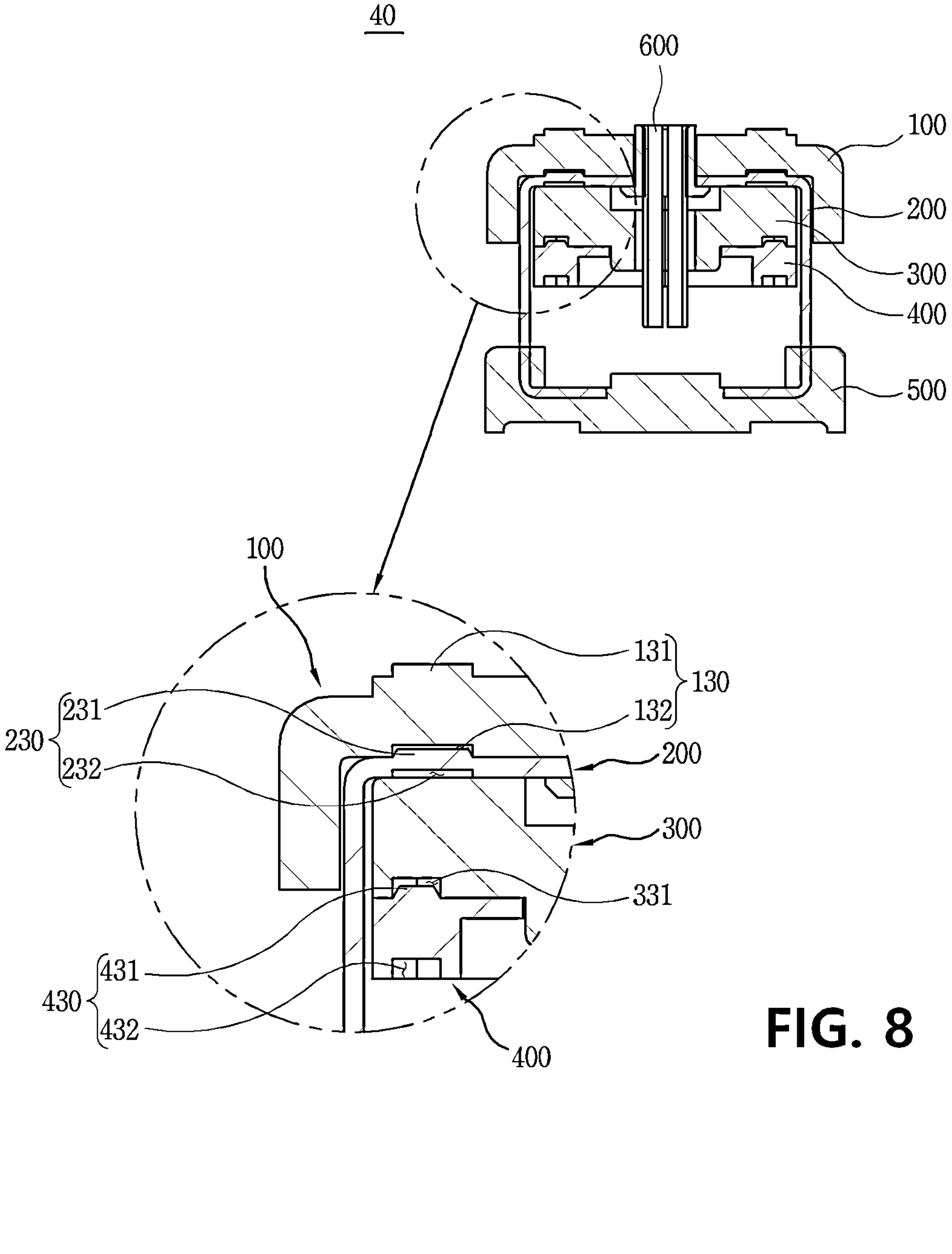
FIG. 8 is a cross-sectional view taken along line C-C' showing the movable contact part of FIG. 6.
Figure 9:
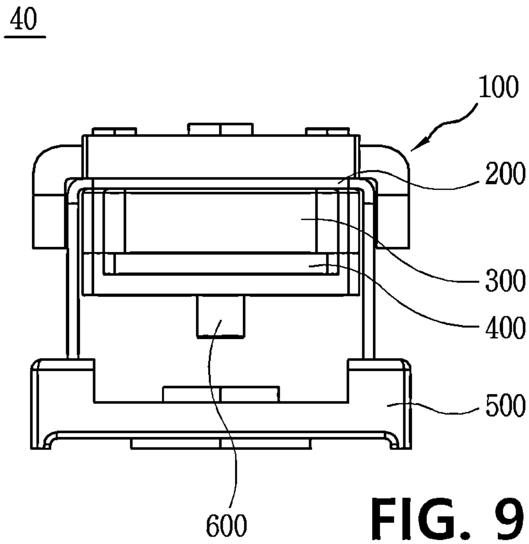
FIG. 9 is a side view showing the movable contact part of FIG. 6.
Figure 10:
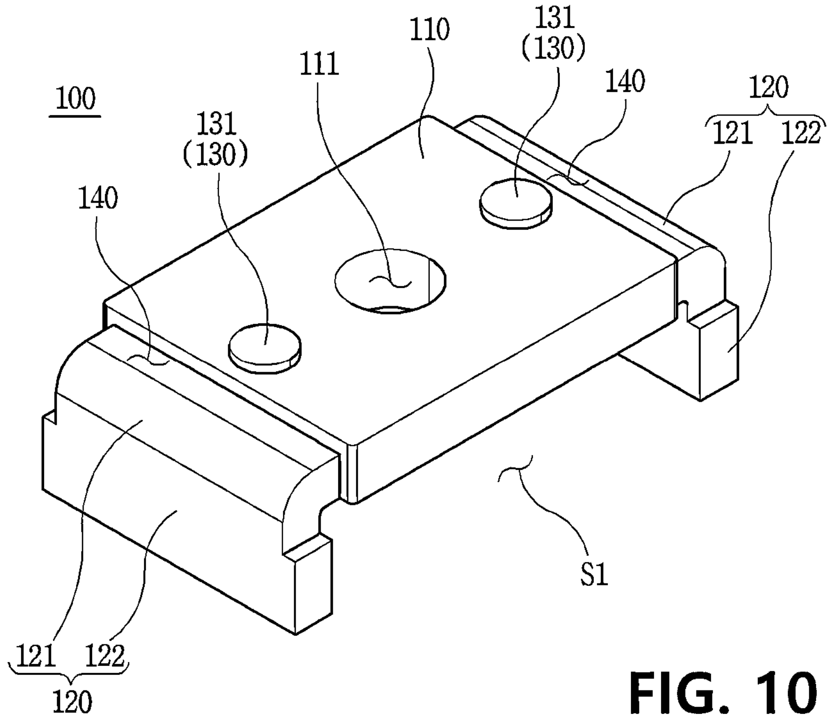
FIG. 10 is a perspective view illustrating an upper yoke provided in the movable contact part of FIG. 6.

In this case, as illustrated in FIG. 8, each coupling part 130, 230, 330, 430 is coupled to each other such that the coupling state of the upper yoke 100, the shaft holder 200, the movable contact 300, the lower yoke 400 and the holder coupling part 500 may be firmly maintained.

(1) Description of the Upper Yoke 100

Referring to FIGS. 10 to 16, the movable contact part 40 according to an exemplary embodiment of the present disclosure includes an upper yoke 100.

The upper yoke 100 attenuates an electrical repulsive force which is generated when the fixed contact 22 and the movable contact 300 come into contact with the control power applied, that is, an electromagnetic repulsive force. When the control power is applied, the upper yoke 100 is magnetized to generate an attractive force.

The upper yoke 100 is positioned to cover the movable contact 300 from one side of the movable contact 300. In the illustrated exemplary embodiment, the upper yoke 100 is positioned on the upper side of the shaft holder 200, and is disposed to face the movable contact 300 and the lower yoke 400 with the shaft holder 200 interposed therebetween.

That is, the upper yoke 100 is located on the outer side and the uppermost side of the movable contact part 40.

The upper yoke 100 partially surrounds the movable contact 300. In the illustrated exemplary embodiment, the upper yoke 100 surrounds the upper, front and rear sides of the movable contact 300.

The upper yoke 100 is coupled to the shaft holder 200. Specifically, the upper coupling part 130 of the upper yoke 100 is coupled to the holder coupling part 230 of the shaft holder 200. In addition, the support rod 600 is through-coupled to the upper yoke 100 and the shaft holder 200, respectively, such that the upper yoke 100 and the shaft holder 200 may be coupled.

The upper yoke 100 is disposed to face the lower yoke 400. Specifically, the upper yoke 100 is disposed to face the lower yoke 400 with the shaft holder 200 and the movable contact 300 interposed therebetween.

The upper yoke 100 may be magnetized to form an electromagnetic attraction force. The electromagnetic attraction force formed by the upper yoke 100 may be transmitted to the lower yoke 400, and press the lower yoke 400 and the movable contact 300 seated on the lower yoke 400 toward the fixed contact 22.

Accordingly, the electromagnetic repulsive force generated between the fixed contact 22 and the movable contact 300 may be attenuated by the electromagnetic attraction force. As a result, the contact state between the fixed contact 22 and the movable contact 300 may be stably maintained.

The upper yoke 100 may be magnetized as current or magnetic field is applied, and may be provided in any shape capable of forming electromagnetic attraction with the lower yoke 400.

In the illustrated exemplary embodiment, the upper yoke 100 includes a cover part 110, an arm part 120, an upper coupling part 130 and an upper slimming groove 140.

The cover part 110 forms a portion of the outer shape of the upper yoke 100. The cover part 110 surrounds a portion of the shaft holder 200 and the movable contact 300, which is the upper portion in the illustrated exemplary embodiment.

The cover part 110 partially surrounds the upper space S1. In the illustrated exemplary embodiment, the space below the cover part 110 may be defined as an upper space S1. The shaft holder 200 and the movable contact 300 may be positioned in the upper space S1.

In the illustrated exemplary embodiment, the cover part 110 has a rectangular cross-section in which the length in the left-right direction is longer than the length in the front-rear direction, and is formed in the shape of a rectangular parallelepiped or a rectangular plate having a vertical height. The shape of the cover part 110 may be changed according to the shapes of the shaft holder 200 and the movable contact 300.

Figure 11:
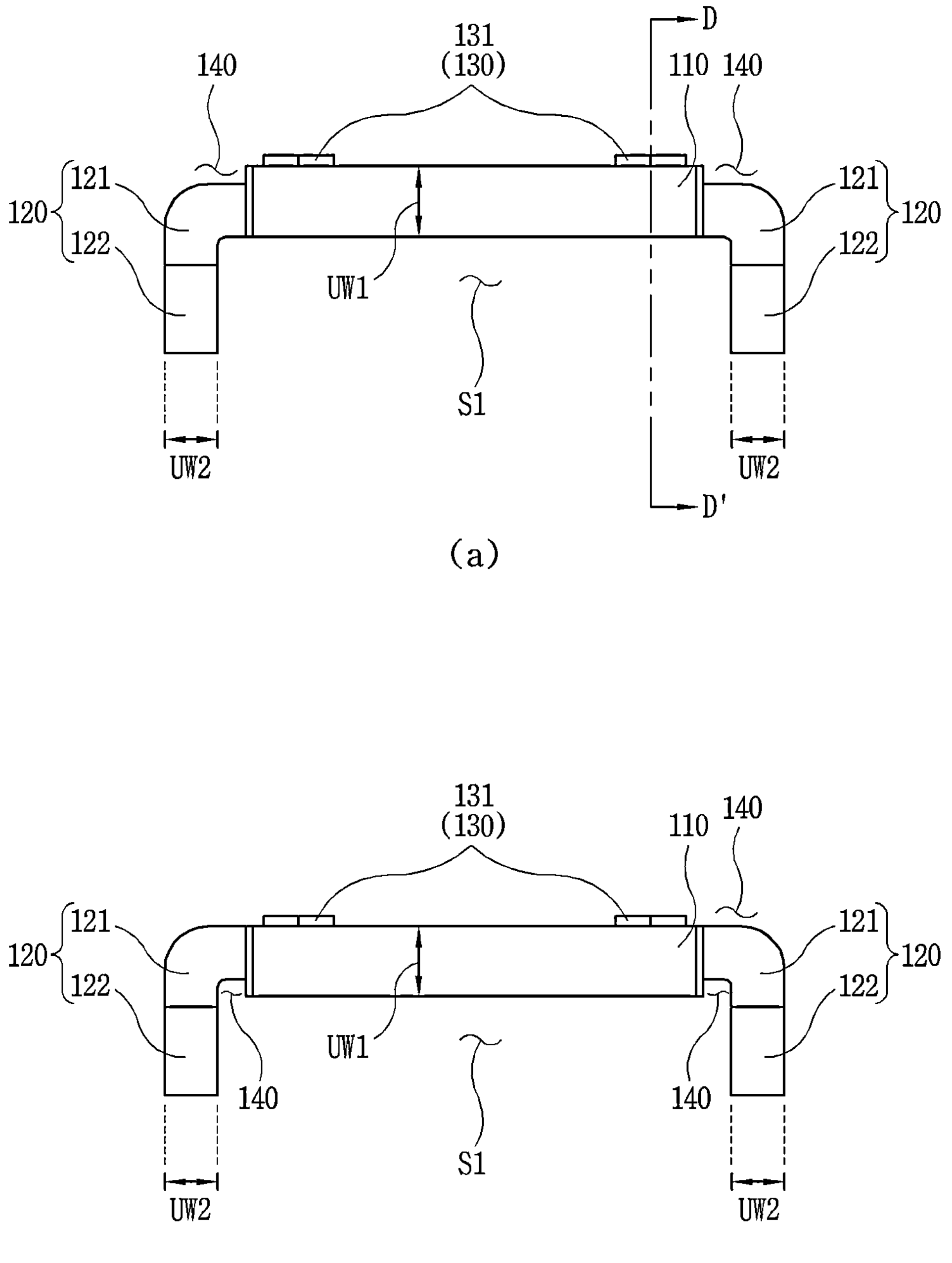
FIG. 11 is a side view showing the upper yoke of FIG. 10.
Figure 12:
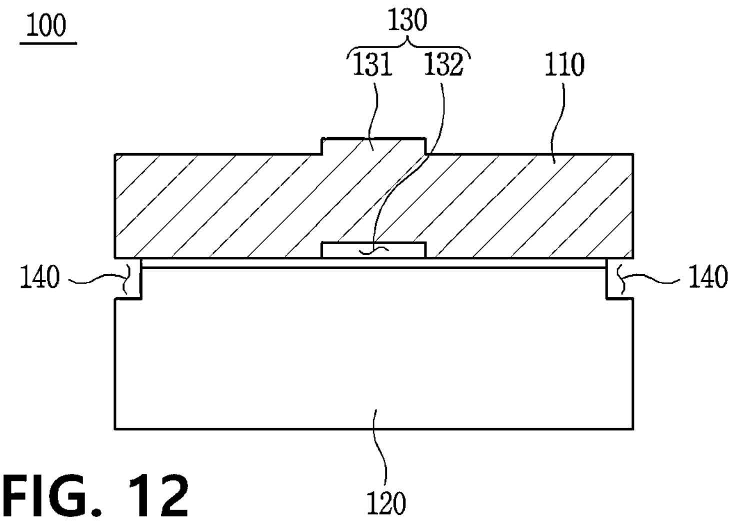
FIG. 12 is a cross-sectional view taken along line D-D' showing the upper yoke of FIG. 10.
Figure 13:
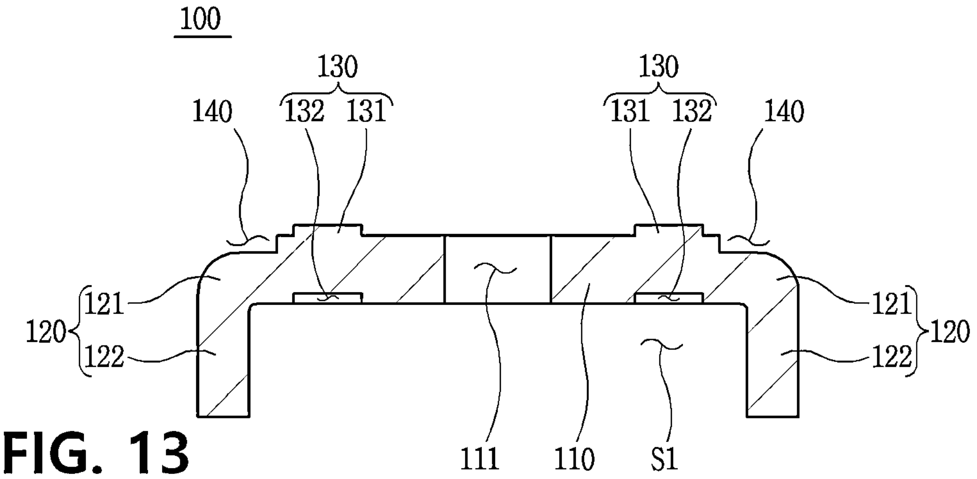
FIG. 13 is a front view showing the upper yoke of FIG. 10.
Figure 14:
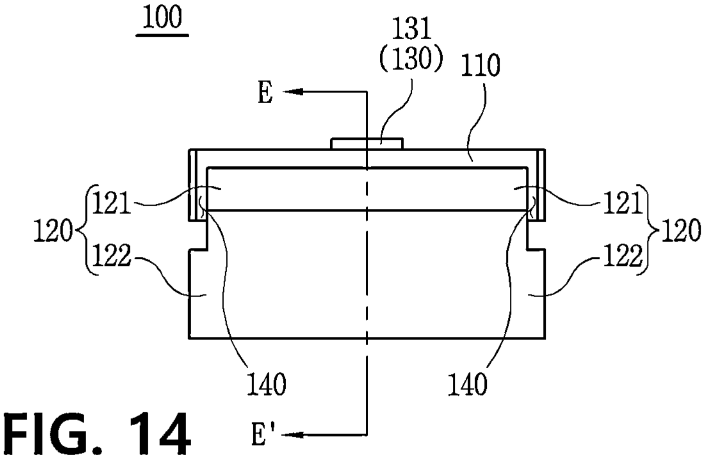
FIG. 14 is a cross-sectional view taken along line E-E' showing the upper yoke of FIG.

The cover part 110 is formed to have a predetermined thickness. That is, as illustrated in FIG. 11, the cover part 110 is formed to have a thickness equal to the first upper width UW1. In this case, the first upper width UW1 of the cover part 110 may be formed to be longer than the second upper width UW2, which is the thickness of the arm part 120.

Figure 15:
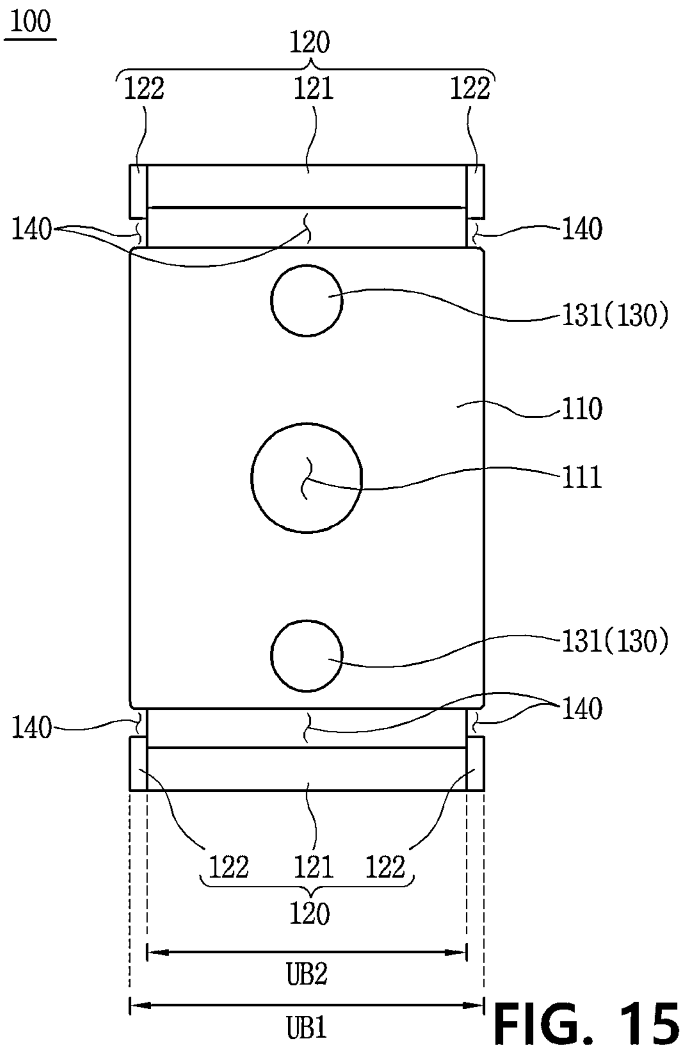
FIG. 15 is a plan view showing the upper yoke of FIG. 10.
Figure 16:
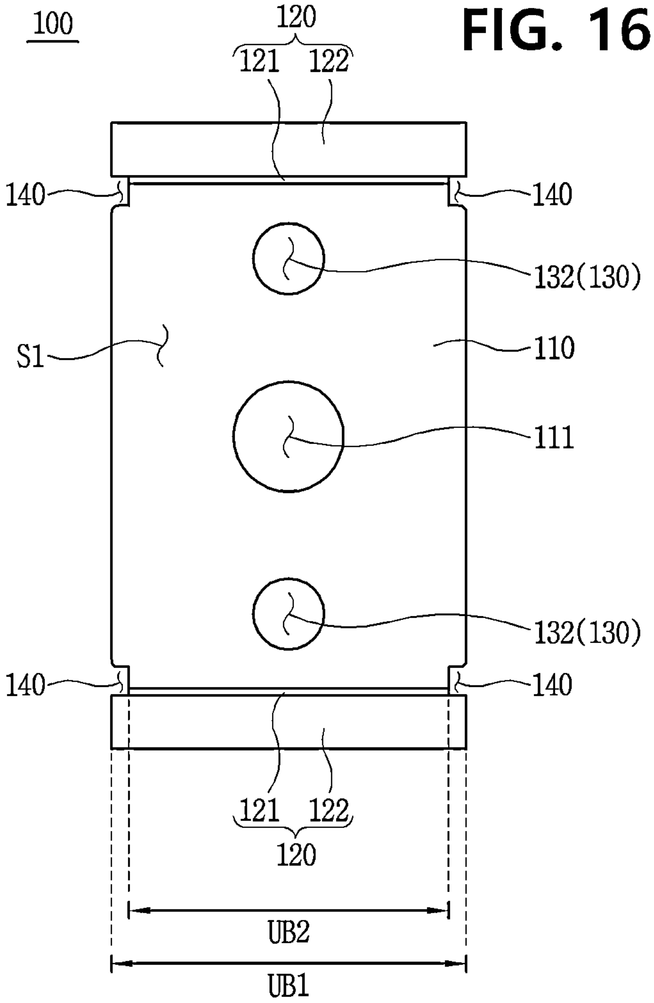
FIG. 16 is a bottom view showing the upper yoke of FIG. 10.
Figure 17:
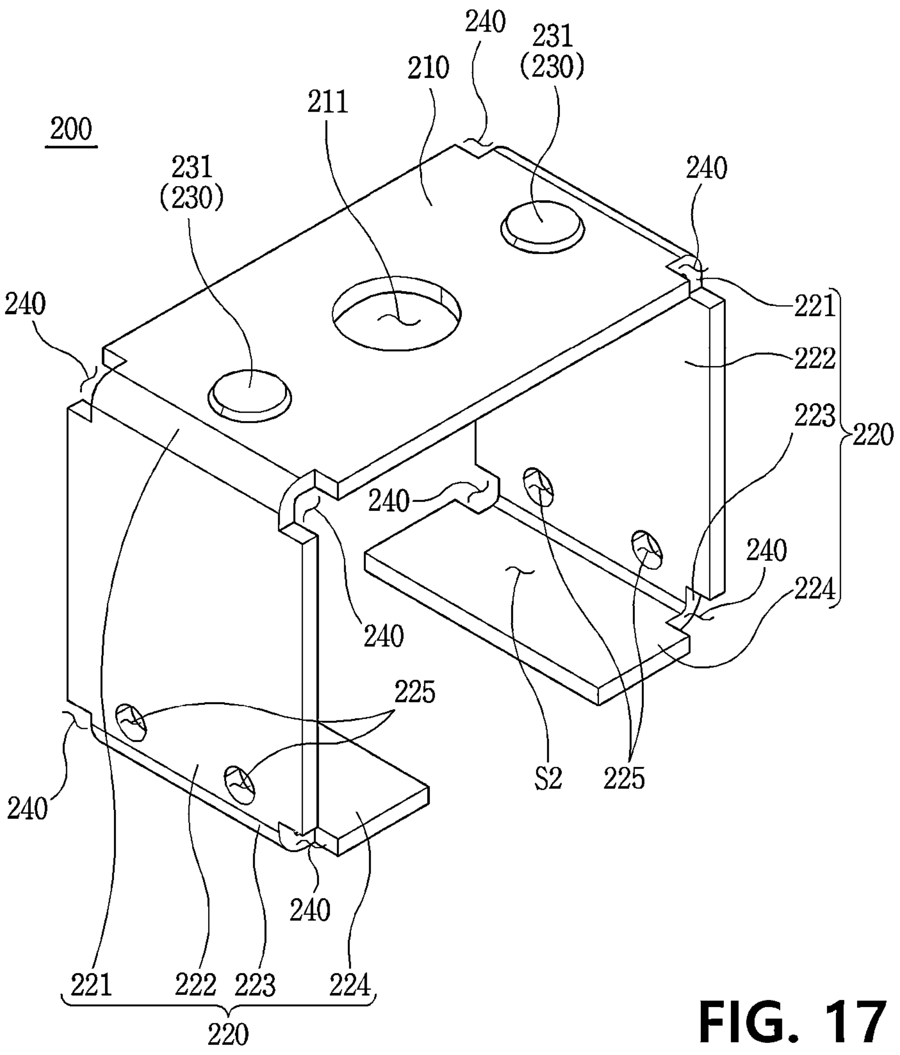
FIG. 17 is a perspective view illustrating a shaft holder provided in the movable contact part of FIG. 6.
Figure 18:
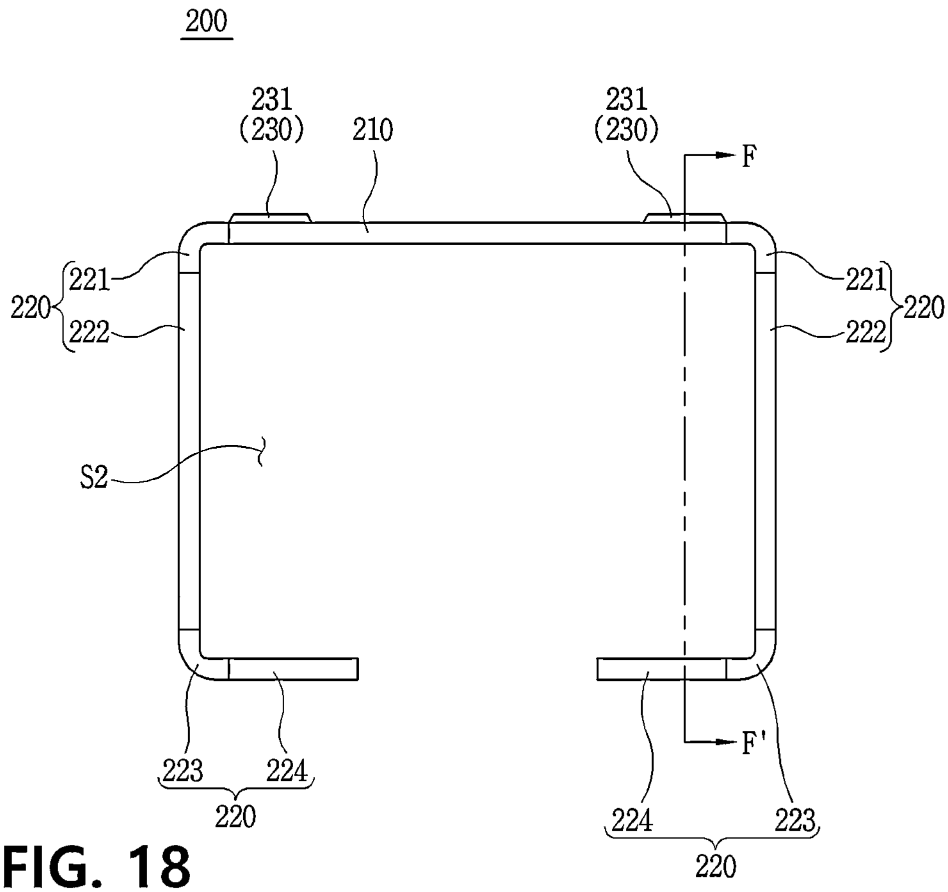
FIG. 18 is a side view showing the shaft holder of FIG. 17.
Figure 19:
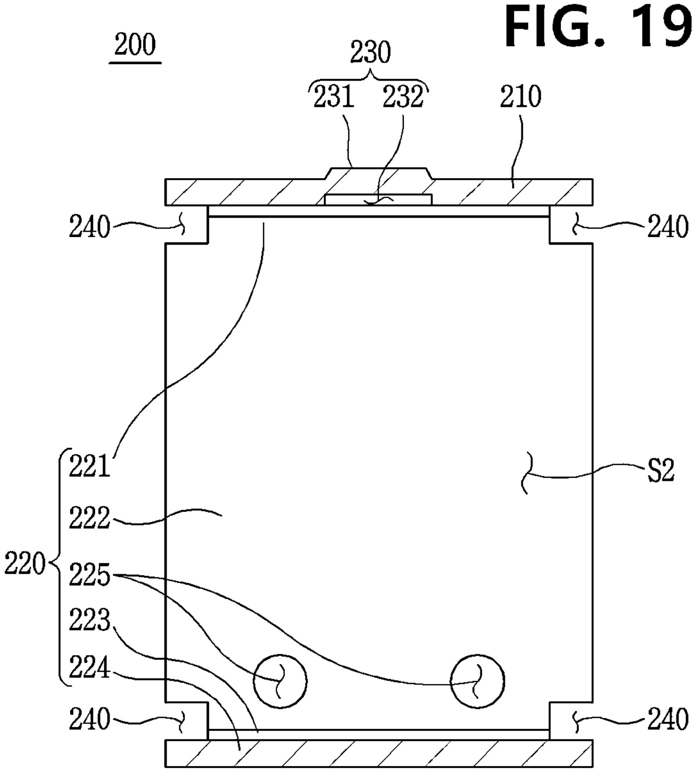
FIG. 19 is a cross-sectional view taken along line F-F' showing the shaft holder of FIG. 17.

The cover part 110 is formed to have a predetermined width. That is, as illustrated in FIGS. 15 and 16, the width of the cover part 110, that is, the length in the left-right direction may be defined as a first upper width UB1. In this case, the first upper width UB1 of the cover part 110 may be formed to be longer than the second upper width UB2, which is the width of the curved portion 121 of the arm part 120.

The detailed description of the effects of the structure will be described below.

An upper through-hole 111 is formed in the inside of the cover part 110. The upper through-hole 111 is a space through which the support rod 600 is coupled. The upper through-hole 111 is formed to penetrate in the thickness direction of the cover part 110, which is the vertical direction in the illustrated exemplary embodiment.

In the illustrated exemplary embodiment, the upper through-hole 111 is formed to have a circular cross-section. The shape of the upper through-hole 111 may be changed according to the shape of the support rod 600.

The upper coupling part 130 is disposed on a pair of surfaces facing each other among the surfaces of the cover part 110. In the illustrated exemplary embodiment, an upper protrusion 131 of the upper coupling part 130 is formed on the upper surface of the cover part 110. In addition, the upper groove 132 of the upper coupling part 130 is formed on the lower surface of the cover part 110.

Each edge in a direction in which the cover part 110 extends longer, and each edge in the front-rear direction in the illustrated exemplary embodiment, are continuous with the arm part 120.

The arm part 120 surrounds the shaft holder 200 and other portions of the movable contact 300. In the illustrated exemplary embodiment, the arm part 120 surrounds the front and rear sides of the shaft holder 200 and the movable contact 300.

The arm part 120 surrounds another portion of the upper space S1. In the illustrated exemplary embodiment, the arm part 120 surrounds the front and rear sides of the upper space S1.

The arm part 120 is continuous with the cover part 110. In addition, a plurality of arm parts 120 may be provided. The plurality of arm parts 120 may be continuous with the cover part 110 at different positions. In the illustrated exemplary embodiment, two arm parts 120 are provided, respectively, to be continuous with each edge in a direction in which the cover part 110 is elongated, that is, the front-rear direction.

The arm part 120 is formed to have a predetermined thickness. That is, as illustrated in FIG. 11, the arm part 120 is formed to have a thickness equal to the second upper width UW2. In this case, the second upper width UW2 of the arm part 120 may be shorter than the first upper width UW1, which is the thickness of the cover part 110.

That is, the arm part 120 is formed to have a thinner thickness than the cover part 110. Accordingly, the coupling position between the arm part 120 and the cover part 110 may be formed in various ways.

That is, in the exemplary embodiment illustrated in (a) of FIG. 11, the arm part 120 is coupled to the cover part 110 to be biased at the lower side of each end of the cover part 110 in the front-rear direction. That is, in the above exemplary embodiment, the lower surface of the curved portion 121 of the arm part 120 and the lower surface of the cover part 110 may be positioned on the same plane.

In the above exemplary embodiment, it will be understood that the position of the outer periphery of the arm part 120 is moved from the radially outward to the inward. That is, the upper surface of the cover part 110 is located above the upper surface of the arm part 120.

In this case, the upper slimming groove 140 which is formed to reduce the weight and volume of the arm part 120 may be defined as a space surrounded by each surface of the cover part 110 in the front-rear direction and the upper side surface of the arm part 120.

In the exemplary embodiment illustrated in (b) of FIG. 11, the arm part 120 is coupled to the cover part 110 to be biased on the upper side of each end of the cover part 110 in the front-rear direction. That is, in the above exemplary embodiment, the upper surface of the curved portion 121 of the arm part 120 and the upper surface of the cover part 110 may be positioned on the same plane.

In the above exemplary embodiment, it will be understood that the position of the inner periphery of the arm part 120 is moved from the inside to the outside in a radial direction. That is, the lower side surface of the cover part 110 is located below the lower side surface of the curved portion 121 of the arm part 120.

In this case, the upper slimming groove 140 which is formed to reduce the weight and volume of the arm part 120 may be defined as a space surrounded by each surface of the cover part 110 in the front-rear direction and the lower side surface of the curved portion 121 of the arm part 120.

In the illustrated exemplary embodiment, the arm part 120 includes a curved portion 121 and an extension portion 122.

The curved portion 121 is a portion in which the arm part 120 is continuous with the cover part 110. The curved portion 121 extends downward from both side edges of the cover part 110, which are each edge in the front-rear direction in the illustrated exemplary embodiment.

The curved portion 121 is formed to be rounded so as to be convex radially outwardly with a predetermined curvature. In the illustrated exemplary embodiment, the curved portion 121 which is located on the front side is formed to be rounded toward the upper side of the front side, and the curved portion 121 which is located on the rear side is rounded toward the upper side of the rear side.

In an exemplary embodiment, the curvature of the curved portion 121 may be the same as the curvature of the first curved portion 221 of the vertical part 220 of the shaft holder 200.

The curved portion 121 is formed to have a predetermined central angle. That is, the curved portion 121 is formed to have an arc-shaped cross-section, the center of which is located in the upper space S1. In an exemplary embodiment, the central angle may be a right angle.

The curved portion 121 is formed to have a predetermined width. That is, as illustrated in FIGS. 15 and 16, the width of the curved portion 121, that is, the length in the left-right direction may be defined as a second upper width UB2. In this case, the second upper width UB2 of the curved portion 121 may be shorter than the first upper width UB1, which is the width of the cover part 110 or the extension portion 122.

An end of the curved portion 121 opposite to the cover part 110, which is the lower end in the illustrated exemplary embodiment, is continuous with the extension portion 122.

The extension portion 122 is continuous with the curved portion 121 and extends downward in a direction in which the curved portion 121 extends, which is the lower side in the illustrated exemplary embodiment. The extension portion 122 surrounds the remaining portion of the shaft holder 200, which is the front and rear sides in the illustrated exemplary embodiment.

The extension portion 122 extends to form a predetermined angle with the curved portion 121. In an exemplary embodiment, the extension portion 122 may extend vertically downward.

The extension portion 122 is formed to have a predetermined width. That is, as illustrated in FIGS. 15 and 16, the width of the extension portion 122, that is, the length in the left-right direction, may be defined as a first upper width UB1. In this case, the first upper width UB1 of the extension portion 122 may be formed to be longer than the second upper width UB2, which is the width of the curved portion 121.

The extension portion 122 surrounds the shaft holder 200 and the movable contact 300 from the lower side compared to the curved portion 121. Accordingly, the coupling state of the upper yoke 100 and the shaft holder 200 may be stably maintained.

The upper coupling part 130 is a portion in which the upper yoke 100 is coupled to the shaft holder 200. Specifically, the upper coupling part 130 is coupled to the holder coupling part 230 of the shaft holder 200.

A plurality of upper coupling parts 130 may be provided. In the illustrated exemplary embodiment, two upper coupling parts 130 are provided, respectively, to be positioned in the front-rear direction of the cover part 110. Further, in the illustrated exemplary embodiment, the upper coupling parts 130 are spaced apart from each other and disposed to face each other with the upper through-hole 111 interposed therebetween.

In other words, the plurality of upper coupling parts 130 are disposed to be spaced apart from each other along a direction in which the cover part 110 extends longer. The plurality of upper coupling parts 130 are respectively coupled to the plurality of holder coupling parts 230.

Accordingly, the upper yoke 100 and the shaft holder 200 are coupled at a plurality of positions, and the coupled state may be stably maintained.

In the illustrated exemplary embodiment, the upper coupling part 130 includes an upper protrusion 131 and an upper groove 132.

The upper protrusion 131 is located on one side surface of the cover part 110 opposite to the shaft holder 200, which is the upper side surface in the illustrated exemplary embodiment. The upper protrusion 131 is formed to protrude upward from the one side surface of the cover part 110.

The shape of the upper protrusion 131 may be changed according to the shape of the upper groove 132. This is due to the upper protrusion 131 protruding in the process of pressing the upper groove 132.

In the illustrated exemplary embodiment, the upper protrusion 131 has a circular cross-section and is provided in a disk shape having a thickness in the vertical direction. In the above exemplary embodiment, the center of the cross-section of the upper protrusion 131 may be disposed on the same axis in the vertical direction as the center of the cross-section of the upper groove 132.

In addition, the thickness of the upper protrusion 131 may be determined to correspond to the thickness of the upper groove 132. In an exemplary embodiment, the thickness of the upper protrusion 131 may be the same as the thickness of the upper groove 132.

The upper groove 132 is located on the other side surface of the cover part 110 facing the shaft holder 200, which is the lower side surface in the illustrated exemplary embodiment. The upper groove 132 is formed to be recessed on the other side surface of the cover part 110.

As described above, the position and shape of the upper groove 132 may be determined to correspond to the position and shape of the upper protrusion 131.

The holder protrusion 231 of the shaft holder 200 is inserted and coupled to the upper groove 132. Accordingly, the upper yoke 100 and the shaft holder 200 may be coupled.

For stable coupling between the upper yoke 100 and the shaft holder 200, the upper groove 132 may be formed to correspond to the shape of the holder protrusion 231.

That is, in the illustrated exemplary embodiment, the upper groove 132 has a circular cross-section and is formed to be recessed by a predetermined distance upward. In addition, the holder protrusion 231 also has a circular cross-section and is formed to protrude toward the upper yoke 100 (refer to FIG. 8).

In this case, the diameter of the cross-section of the upper groove 132 may be greater than or equal to the diameter of the cross-section of the holder protrusion 231. In addition, the distance at which the upper groove 132 is formed to be recessed may be greater than or equal to the length at which the holder protrusion 231 is formed to protrude.

Accordingly, the holder protrusion 231 may be stably coupled to the upper groove 132. In an exemplary embodiment, the upper groove 132 is formed to have the same diameter and depth as the holder protrusion 231 such that the holder protrusion 231 may be fitted and coupled to the upper groove 132.

The upper slimming groove 140 may be defined as a space which is positioned outside among the spaces formed by being surrounded by the cover part 110 and the arm part 120. The upper slimming groove 140 is a space formed by reducing the thickness of the arm part 120.

The upper thinning groove 140 is formed by a difference in thickness between the cover part 110 and the arm part 120. That is, the upper slimming groove 140 is defined as the second upper width UW2 of the arm part 120 is smaller than the first upper width UW1 of the cover part 110.

Therefore, compared to the case where the cover part 110 and the arm part 120 have the same thickness, the volume and weight of the upper yoke 100 are reduced by the volume of the upper slimming groove 140 and the weight of the arm part 120 having a volume corresponding to the above volume.

A plurality of upper thinning grooves 140 may be formed. The plurality of upper slimming grooves 140 may be respectively located adjacent to the plurality of arm parts 120. In the illustrated exemplary embodiment, the upper slimming groove 140 is formed on the front and rear sides, respectively.

The upper thinning groove 140 may be formed to have a predetermined thickness. In the exemplary embodiment illustrated in FIG. 11, the upper slimming groove 140 is formed to have a thickness equal to the difference between the first upper width UW1 and the second upper width UW2.

The upper slimming groove 140 may be formed to have a predetermined width. In the exemplary embodiment illustrated in FIGS. 15 and 16, the upper slimming groove 140 is formed to have a width equal to the first upper width UB1.

The upper slimming groove 140 may communicate with the upper space S1. In the illustrated exemplary embodiment, the left and right ends of the upper slimming groove 140 communicate with the upper space S1. It will be understood that the left and right ends are formed to have a width equal to a difference between the first upper width UB1 and the second upper width UB2.

In the upper yoke 100 according to an exemplary embodiment of the present disclosure, the volume and weight of the arm part 120 are reduced by the volume of the upper slimming groove 140 and the weight of the arm part 120 having a volume corresponding thereto.

Accordingly, the operating performance of the upper yoke 100 may be improved. In addition, the durability against vibration and shock generated by the operation of the direct current relay 1 may be strengthened.

Meanwhile, the effect of reducing the electromagnetic repulsive force which is one role of the upper yoke 100 may be improved as the volume or width of the upper yoke 100 increases.

Accordingly, in the upper yoke 100 according to an exemplary embodiment of the present disclosure, the length of the first upper width UW1 which is the thickness of the cover part 110 is formed to be longer than the second upper width UW2 which is the thickness of the curved portion 121 of the arm part 120. That is, the cover part 110 is formed to have a thickness sufficient to form an electromagnetic attraction force.

In addition, the extension portion 122 of the arm part 120 is formed to have a width equal to the first upper width UB1 which is the width of the cover part 110, and extends downward enough so as to cover the movable contact on the front side and rear side.

Therefore, the upper yoke 100 according to an exemplary embodiment of the present disclosure reduces the weight to improve the operating performance and durability against vibration and shock, while at the same time maximizing the effect of reducing the electromagnetic repulsive force.

(2) Description of the Shaft Holder 200

Referring to FIGS. 17 to 23, the movable contact part 40 according to an exemplary embodiment of the present disclosure includes a shaft holder 200.

The shaft holder 200 partially surrounds the movable contact 300. In addition, the shaft holder 200 is coupled to the holder coupling part 500, and consequently coupled to the shaft 38.

A space is formed inside the shaft holder 200. The movable contact 300 and the lower yoke 400 are accommodated in the space. The space formed inside the shaft holder 200 may be defined as a holder space S2.

The shaft holder 200 is positioned between the upper yoke 100 and the movable contact 300. That is, the shaft holder 200 is located on the lower side of the upper yoke 100 and the upper side of the movable contact 300.

The shaft holder 200 is coupled to the upper yoke 100. Specifically, the upper coupling part 130 of the upper yoke 100 and the holder coupling part 230 of the shaft holder 200 may be coupled such that the upper yoke 100 and the shaft holder 200 are coupled.

In this case, the upper side, the front side and the rear side of the shaft holder 200 may be surrounded by the upper yoke 100.

The shaft holder 200 may be coupled to the movable contact 300. That is, in an exemplary embodiment in which the contact groove 331 is formed to protrude from the movable contact 300, the holder coupling part 230 and the contact groove 331 of the shaft holder 200 may be coupled such that the shaft holder 200 and the movable contact. 300 are coupled.

In this case, the shaft holder 200 may surround the upper side, the front side and the rear side of the movable contact 300.

The shaft holder 200 may be coupled to the holder coupling part 500. Specifically, a lower portion of the vertical extension portion 222 of the shaft holder 200, the second curved portion 223 and the horizontal extension portion 224 are inserted and coupled to the holder coupling part 500.

In an exemplary embodiment, the shaft holder 200 may be formed of a metal material such as SUS304 and the like. Alternatively, the shaft holder 200 may be formed of an injection molding material of a synthetic resin material.

In the illustrated exemplary embodiment, the shaft holder 200 includes a horizontal part 210, a vertical part 220, a holder coupling part 230 and a holder slimming groove 240.

The horizontal part 210 forms one side of the shaft holder 200 facing the upper yoke 100, which is the upper side in the illustrated exemplary embodiment. The horizontal part 210 is positioned between the upper yoke 100 and the movable contact 300.

The horizontal part 210 is covered by the cover part 110 of the upper yoke 100. The horizontal part 210 may be coupled to the cover part 110. The coupling is achieved by coupling the upper coupling part 130 and the holder coupling part 230.

The horizontal part 210 covers the movable contact 300. The horizontal part 210 may be coupled to the movable contact 300. The coupling is achieved by coupling the holder coupling part 230 and the contact coupling part 330 of the movable contact 300.

The horizontal part 210 may be provided in a plate shape having an extension length in one direction longer than an extension length in the other direction and having a predetermined thickness. In the illustrated exemplary embodiment, the horizontal part 210 is formed in the shape of a rectangular plate having a length in the front-rear direction longer than an extension length in the left-right direction and having a thickness in the vertical direction.

In this case, the length of the horizontal part 210 in the width direction, that is, the length in the left-right direction may be defined as a first holder width HW1. The first holder width HW1 may be formed to be longer than the second holder width HW2 which is the width of the first curved portion 221 and the second curved portion 223 of the vertical part 220.

A space equal to the difference between the first holder width HW1 and the second holder width HW2 may be defined as a holder slimming groove 240. The detailed description thereof will be provided below.

The shape of the horizontal part 210 may be changed according to the shapes of the upper yoke 100, the movable contact 300, and the lower yoke 400.

The horizontal part 210 covers the holder space S2. In other words, the horizontal part 210 is located above the holder space S2, and partially surrounds the holder space S2.

Among the surfaces of the horizontal part 210, the holder protrusion 231 of the holder coupling part 230 is located on one side surface facing the upper yoke 100, or in other words, on one side surface opposite to the holder space S2. In addition, a holder groove 232 is formed on the other side surface opposite to the upper yoke 100 of each side of the horizontal part 210, or in other words, on the other side surface facing the holder space S2.

In the illustrated exemplary embodiment, a holder protrusion 231 is disposed on the upper side surface of the horizontal part 210. In addition, a holder groove 232 is disposed on the lower side surface of the horizontal part 210.

A holder through-hole 211 is formed inside the horizontal part 210. The holder through-hole 211 is a space through which the support rod 600 is coupled. The holder through-hole 211 is formed through the horizontal part 210 in the thickness direction, which is the vertical direction in the illustrated exemplary embodiment.

In the illustrated exemplary embodiment, the holder through-hole 211 is formed to have a circular cross-section. The shape of the holder through-hole 211 may be changed according to the shape of the support rod 600.

The center of the cross-section of the holder through-hole 211 may be located on the same axis in the vertical direction as the center of the cross-section of the upper through-hole 111 and the central axis of the support rod 600.

A holder coupling part 230 is disposed on a pair of surfaces facing each other among the surfaces of the horizontal part 210. In the illustrated exemplary embodiment, a holder protrusion 231 is disposed on the upper side surface of the horizontal part 210. In addition, a holder groove 232 is disposed on the lower side surface of the horizontal part 210.

Each edge in a direction in which the horizontal part 210 extends longer, and each edge in the front-rear direction in the illustrated exemplary embodiment, are continuous with the vertical part 220.

The vertical part 220 partially surrounds the movable contact 300 and the lower yoke 400. In the illustrated exemplary embodiment, the vertical part 220 surrounds the front and rear sides of the movable contact 300 and the lower yoke 400.

The vertical part 220 is formed to extend in a direction opposite to the upper yoke 100. In the illustrated exemplary embodiment, the vertical part 220 is formed to extend downwardly, to be coupled to the holder coupling part 500.

The vertical part 220 surrounds another portion of the holder space S2. In the illustrated exemplary embodiment, the vertical part 220 surrounds the front and rear sides of the holder space S2.

The vertical part 220 is continuous with the horizontal part 210. A plurality of vertical parts 220 may be provided to be continuous with the horizontal parts 210 at different positions. In the illustrated exemplary embodiment, two vertical parts 220 are provided, respectively, to be continuous with each edge in a direction in which the horizontal part 210 extends, that is, in the front-rear direction, respectively.

The vertical part 220 is coupled to the holder coupling part 500. Specifically, the lower side of the vertical extension portion 222 of the vertical part 220, the second curved portion 223 and the horizontal extension portion 224 are inserted and coupled to the holder coupling part 500.

The vertical part 220 is formed to have a predetermined thickness. In an exemplary embodiment, the vertical part 220 may be formed to have the same thickness as the horizontal part 210.

In the illustrated exemplary embodiment, the vertical part 220 includes a first curved portion 221, a vertical extension portion 222, a second curved portion 223, a horizontal extension portion 224 and a fastening hole 225.

The first curved portion 221 is a portion in which the vertical part 220 is continuous with the horizontal part 210. The first curved portion 221 is continuous with the edge in a direction in which the horizontal part 210 extends, which is the edge on the front and rear sides in the illustrated exemplary embodiment, respectively.

The first curved portion 221 is formed to be round and convex radially outward with a predetermined curvature. In the illustrated exemplary embodiment, the first curved portion 221 which is located on the front side is formed to be rounded toward the upper side of the front side, and the first curved portion 221 which is located on the rear side is rounded toward the upper side of the rear side.

In an exemplary embodiment, the curvature of the first curved portion 221 may be the same as the curvature of the curved portion 121 of the upper yoke 100.

The first curved portion 221 is formed to have a predetermined central angle. That is, the first curved portion 221 is formed to have an arc-shaped cross-section whose center is located in the holder space S2. In an exemplary embodiment, the central angle may be a right angle.

Figure 20:
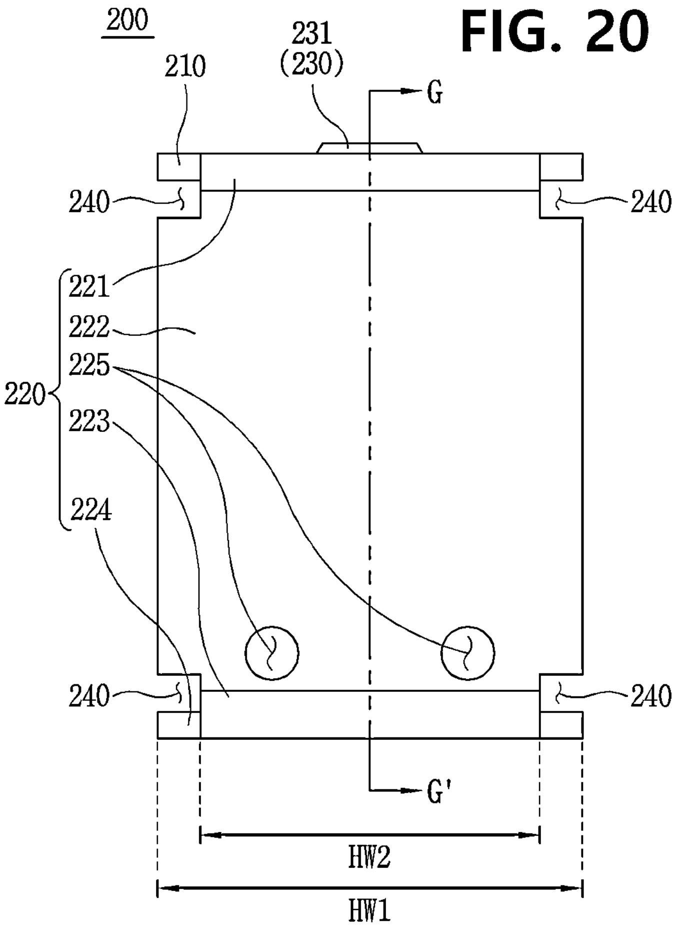
FIG. 20 is a front view showing the shaft holder of FIG. 17.
Figure 21:
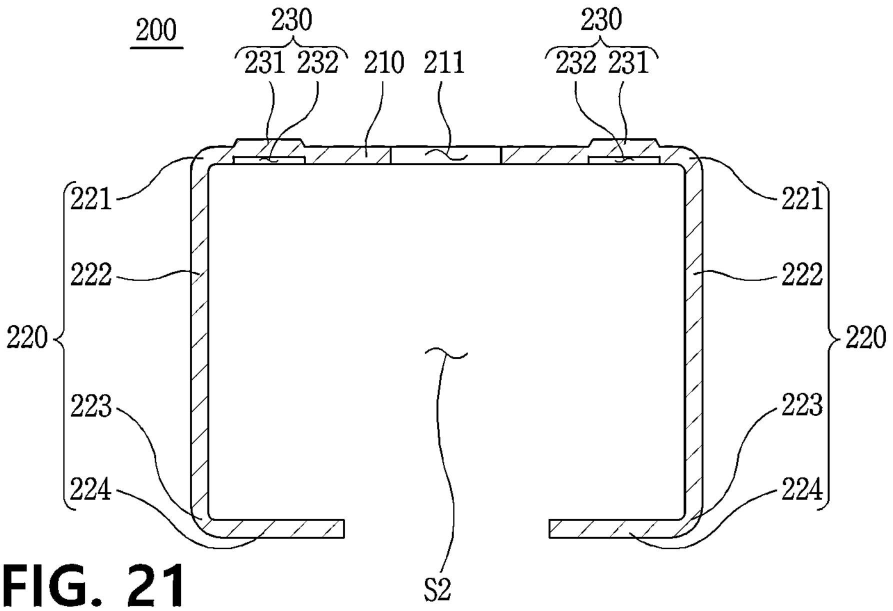
FIG. 21 is a cross-sectional view taken along line G-G' showing the shaft holder of FIG. 17.
Figure 22:
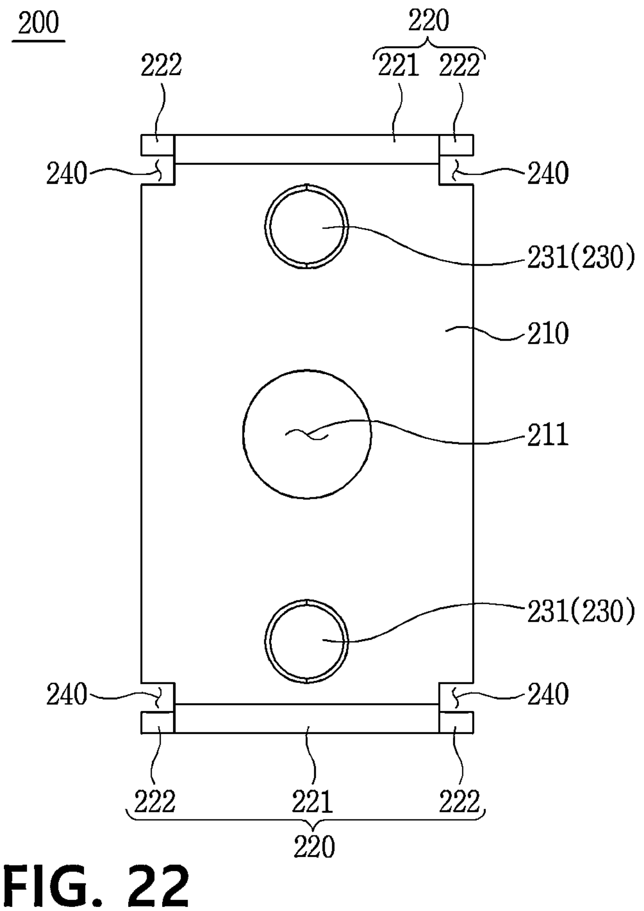
FIG. 22 is a plan view showing the shaft holder of FIG. 17.
Figure 23:
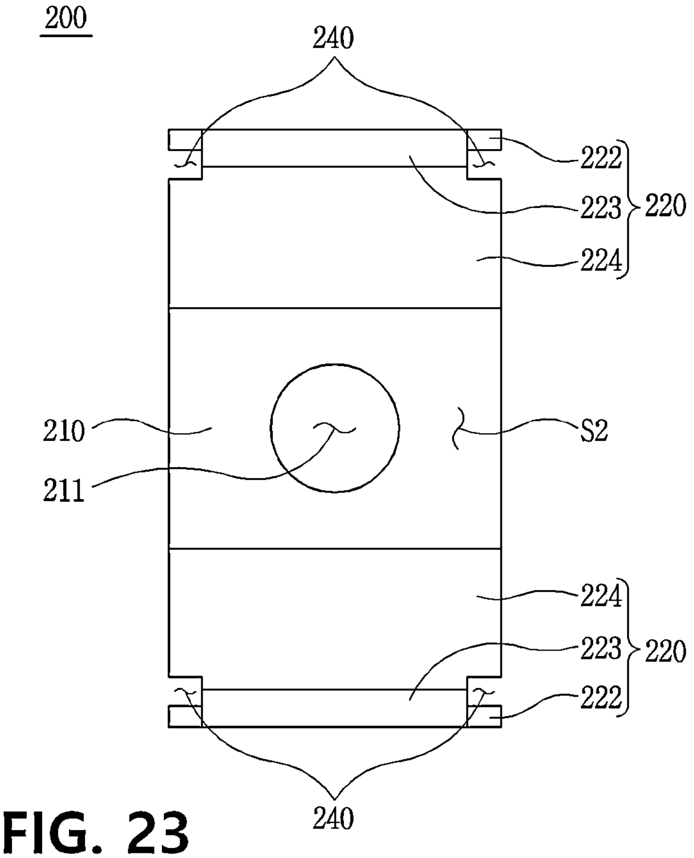
FIG. 23 is a bottom view showing the shaft holder of FIG. 17.
Figure 24:
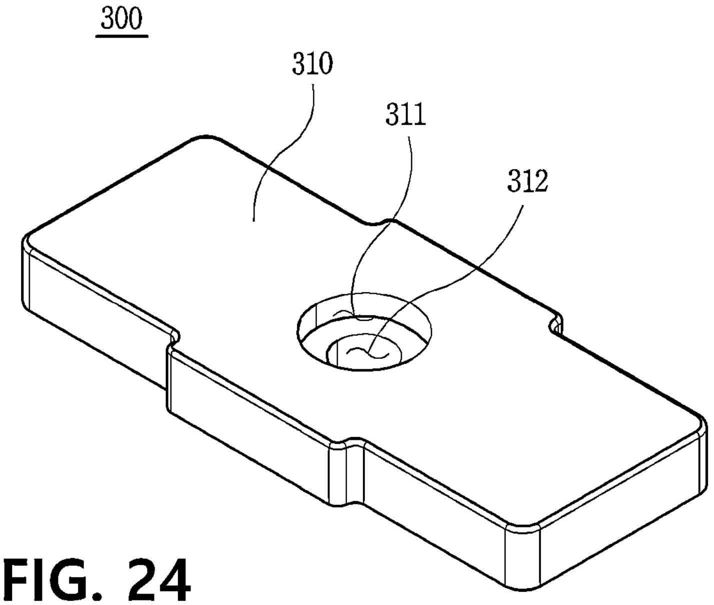
FIG. 24 is a perspective view illustrating a movable contact provided in the movable contact part of FIG. 6.
Figure 25:
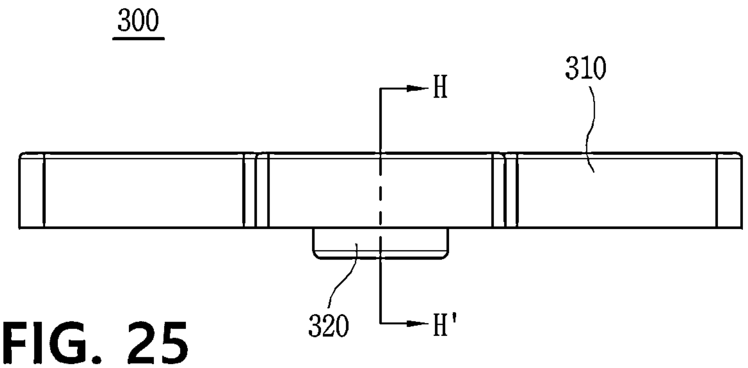
FIG. 25 is a side view showing the movable contact part of FIG. 24.
Figure 26:
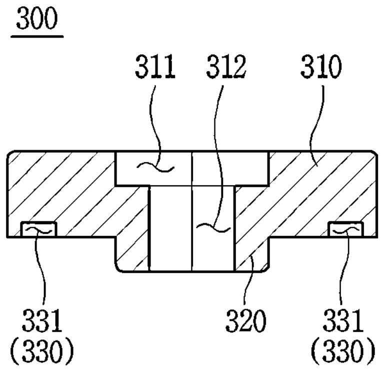
FIG. 26 is a cross-sectional view taken along line H-H' showing the movable contact part of FIG. 24.
Figure 27:
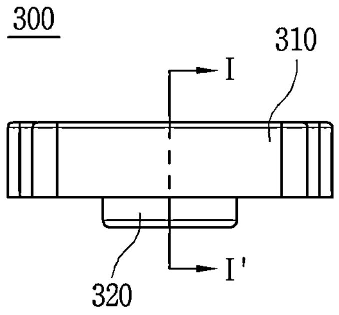
FIG. 27 is a front view showing the movable contact part of FIG. 24.
Figure 28:
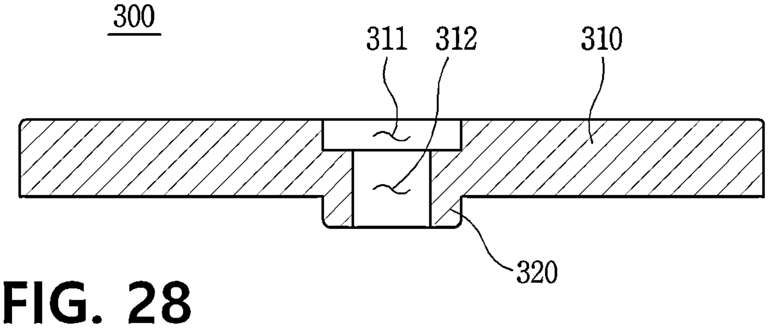
FIG. 28 is a cross-sectional view taken along line I-I' showing the movable contact part of FIG. 24.
Figure 29:
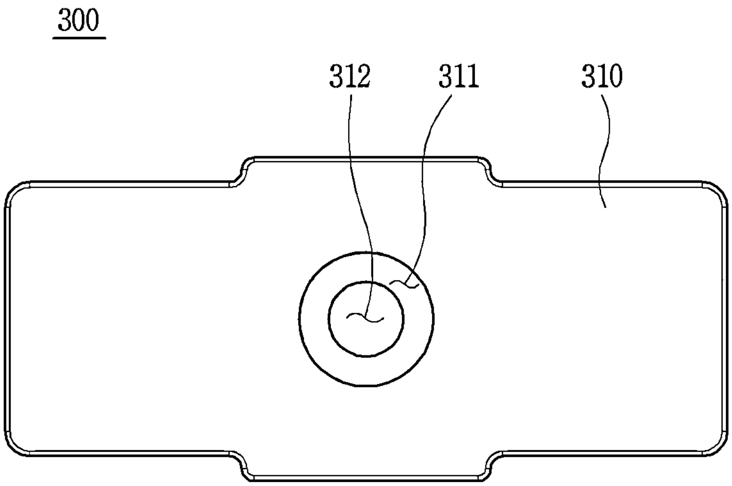
FIG. 29 is a plan view showing the movable contact part of FIG. 24.
Figure 30:
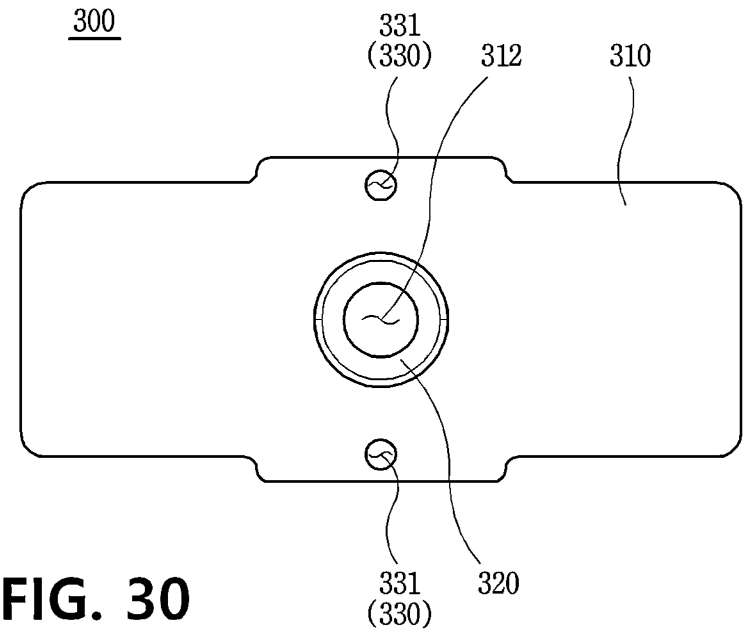
FIG. 30 is a bottom view showing the movable contact part of FIG. 24.

The first curved portion 221 is formed to have a predetermined width. That is, as illustrated in FIG. 20, the width of the first curved portion 221, that is, the length in the left-right direction may be defined as a second holder width HW2. In this case, the second holder width HW2 of the first curved portion 221 may be formed to be shorter than the first holder width HW1, which is the width of the horizontal part 210, the vertical part 220 or the horizontal extension portion 224.

Accordingly, a holder slimming groove 240 communicating with the holder space S2 is formed at each end of the first curved portion 221 in the width direction, which is at the end in the left-right direction in the illustrated exemplary embodiment.

An end of the first curved portion 221 opposite to the horizontal part 210, which is the lower end in the illustrated exemplary embodiment, is continuous with the vertical extension portion 222.

The vertical extension portion 222 extends toward the holder coupling part 500. In the illustrated exemplary embodiment, the vertical extension portion 222 extends in a direction opposite to the upper yoke 100, that is, downward.

The vertical extension portion 222 partially surrounds the movable contact 300 and the lower yoke 400. In the illustrated exemplary embodiment, the vertical extension portion 222 surrounds the front and rear sides of the movable contact 300 and the lower yoke 400.

The vertical extension portion 222 partially surrounds the holder space S2. In the illustrated exemplary embodiment, the vertical extension portion 222 surrounds the front and rear sides of the holder space S2.

A plurality of vertical extension portions 222 may be provided. The plurality of vertical extension portions 222 are disposed to face each other with the holder space S2 interposed therebetween. In an exemplary embodiment, the plurality of vertical extension portions 222 may extend to be parallel to each other.

The vertical extension portion 222 may be formed to have a predetermined width. That is, as illustrated in FIG. 20, the width of the vertical extension portion 222, that is, the length in the left-right direction, may be defined as a first holder width HW1. As described above, the first holder width HW1 may be formed to be longer than the second holder width HW2.

A lower side of the vertical extension portion 222 is coupled to the holder coupling part 500. In an exemplary embodiment, the lower side of the vertical extension portion 222 may be insert injection-molded with the holder coupling part 500.

A fastening hole 225 is formed through the inside of the vertical extension portion 222.

The vertical extension portion 222 is continuous with the second curved portion 223.

The second curved portion 223 connects the vertical extension portion 222 and the horizontal extension portion 224. The second curved portion 223 is continuous with the vertical extension portion 222 and the horizontal extension portion 224, respectively.

The second curved portion 223 is formed to be rounded and convex radially outward with a predetermined curvature. In the illustrated exemplary embodiment, the second curved portion 223 which is located on the front side is formed to be rounded toward the lower side of the front side, and the second curved portion 223 which is located on the rear side is formed to be rounded toward the lower side of the rear side.

In an exemplary embodiment, the curvature of the second curved portion 223 may be the same as the curvature of the curved portion 121 of the upper yoke 100 or the curvature of the first curved portion 221.

The second curved portion 223 is formed to have a predetermined central angle. That is, the second curved portion 223 is formed to have an arc-shaped cross-section whose center is located in the holder space S2. In an exemplary embodiment, the central angle may be a right angle.

The second curved portion 223 is formed to have a predetermined width. That is, as illustrated in FIG. 20, the width of the second curved portion 223, that is, the length in the left-right direction may be defined as a second holder width HW2. In this case, the second holder width HW2 of the second curved portion 223 may be formed to be shorter than the first holder width HW1, which is the width of the horizontal part 210, the vertical part 220 or the horizontal extension portion 224.

Accordingly, a holder slimming groove 240 communicating with the holder space S2 is formed at each end of the second curved portion 223 in the width direction, which is at the end in the left-right direction in the illustrated exemplary embodiment.

The second curved portion 223 is coupled to the holder coupling part 500. In an exemplary embodiment, the second curved portion 223 may be insert injection-molded with the holder coupling part 500.

The second curved portion 223 is continuous with the horizontal extension portion 224.

The horizontal extension portion 224 is a portion in which the shaft holder 200 is coupled to the holder coupling part 500. The horizontal extension portion 224 is inserted and coupled to the inside of the holder coupling part 500. Accordingly, when the production of the movable contact part 40 is completed, the horizontal extension portion 224 may not be exposed to the outside.

Accordingly, the coupling state of the shaft holder 200 and the holder coupling part 500 may be stably maintained.

A plurality of horizontal extension portions 224 may be provided. The plurality of horizontal extension portions 224 may extend toward each other. In the illustrated exemplary embodiment, the horizontal extension portion 224 which is located on the front side extends toward the rear side, and the horizontal extension portion 224 which is located on the rear side extends toward the front side.

The horizontal extension portion 224 partially surrounds the holder space S2 and the movable contact 300 and the lower yoke 400 accommodated in the holder space S2. In the illustrated exemplary embodiment, the horizontal extension portion 224 surrounds the holder space S2, the movable contact 300 and the lower yoke 400 from the lower side.

The horizontal extension portion 224 may be formed to have a predetermined width. That is, as illustrated in FIG. 20, the width of the horizontal extension portion 224, that is, the length in the left-right direction may be defined as a first holder width HW1. As described above, the first holder width HW1 may be formed to be longer than the second holder width HW2.

A fastening member (not illustrated) for coupling the shaft holder 200 to the holder coupling part 500 is inserted through the fastening hole 225. The fastening hole 225 is formed through the lower side of the vertical part 220 in the thickness direction, which is the front-rear direction in the illustrated exemplary embodiment.

A plurality of fastening holes 225 may be provided. That is, the shaft holder 200 may be coupled to the holder coupling part 500 at a plurality of positions. Accordingly, the coupling state of the shaft holder 200 and the holder coupling part 500 may be stably maintained.

The number and arrangement of the fastening holes 225 may be changed according to the coupling method between the shaft holder 200 and the holder coupling part 500.

The holder coupling part 230 is a portion in which the shaft holder 200 is coupled to the upper yoke 100 and the movable contact 300. Specifically, the holder coupling part 230 is coupled to the upper coupling part 130 of the upper yoke 100 and the contact coupling part 330 of the movable contact 300, respectively.

A plurality of holder coupling parts 230 may be provided. In the illustrated exemplary embodiment, two holder coupling parts 230 are provided, respectively, to be positioned in the front-rear direction of the horizontal part 210. Further, in the illustrated exemplary embodiment, the holder coupling parts 230 are spaced apart from each other and disposed to face each other with the holder through-hole 211 interposed therebetween.

In other words, the plurality of holder coupling parts 230 are disposed to be spaced apart from each other along a direction in which the horizontal part 210 extends longer. The plurality of holder coupling parts 230 are respectively coupled to the plurality of upper coupling parts 130 and the contact coupling parts 330.

Accordingly, the shaft holder 200 is coupled to the upper yoke 100 and the movable contact 300 at a plurality of positions, respectively, and the coupled state may be stably maintained.

In the illustrated exemplary embodiment, the holder coupling part 230 includes a holder protrusion 231 and a holder groove 232.

The holder protrusion 231 is located on one side surface of the horizontal part 210 facing the upper yoke 100, which is the upper side surface in the illustrated exemplary embodiment. The holder protrusion 231 is formed to protrude upward from the one side surface of the horizontal part 210 of the shaft holder 200.

The shape of the holder protrusion 231 may be changed according to the shape of the holder groove 232. This is because the holder protrusion 231 may protrude while the holder groove 232 is pressed.

In the illustrated exemplary embodiment, the holder protrusion 231 has a circular cross-section and is provided in a disk shape having a thickness in the vertical direction. In the above exemplary embodiment, the center of the cross-section of the holder protrusion 231 may be disposed on the same axis in the vertical direction as the center of the cross-section of the holder groove 232.

In addition, the thickness of the holder protrusion 231 may be determined to correspond to the thickness of the holder groove 232. In an exemplary embodiment, the thickness of the holder protrusion 231 may be the same as the thickness of the holder groove 232.

The holder protrusion 231 is inserted into the upper groove 132 of the upper coupling part 130. As described above, the cross-sectional shape of the holder protrusion 231 may be formed to correspond to the cross-sectional shape of the upper groove 132.

In addition, the diameter of the cross-section of the holder protrusion 231 may be formed to be less than or equal to the diameter of the cross-section of the upper groove 132, and the length at which the holder protrusion 231 protrudes may be formed to be less than the length at which the upper groove 132 is recessed.

The holder groove 232 is located on the other side surface of the horizontal part 210 facing the movable contact 300, which is the lower side surface in the illustrated exemplary embodiment. The holder groove 232 is formed to be recessed in the other side surface of the horizontal part 210.

As described above, the position and shape of the holder groove 232 may be determined to correspond to the position and shape of the holder protrusion 231.

The contact protrusion 332 of the movable contact 300 is inserted and coupled to the holder groove 232. Accordingly, the shaft holder 200 and the movable contact 300 may be coupled.

For stable coupling between the shaft holder 200 and the movable contact 300, the holder groove 232 may be formed to correspond to the shape of the contact protrusion 332.

That is, in the illustrated exemplary embodiment, the holder groove 232 has a circular cross-section and is formed to be recessed by a predetermined distance upward. In addition, the contact protrusion 332 also has a circular cross-section and is formed to protrude toward the shaft holder 200 (refer to FIG. 31).

In this case, the diameter of the cross-section of the holder groove 232 may be greater than or equal to the diameter of the cross-section of the contact protrusion 332. In addition, the distance at which the holder groove 232 is formed to be recessed may be greater than or equal to the length at which the contact protrusion 332 is formed to protrude.

Accordingly, the contact protrusion 332 may be stably coupled to the holder groove 232. In an exemplary embodiment, the holder groove 232 is formed to have the same diameter and depth as the contact protrusion 332, and the contact protrusion 332 may be fitted and coupled to the holder groove 232.

The holder slimming groove 240 may be defined as a space positioned outside among the spaces formed by being surrounded by the horizontal part 210 and the vertical part 220. The holder slimming groove 240 is a space formed by reducing the widths of the first curved portion 221 and the second curved portion 223 of the vertical part 220.

The holder slimming groove 240 is formed by the difference in the widths of the horizontal part 210, the vertical extension portion 222 of the vertical part 220 and the horizontal extension portion 224 and the widths of the first curved portion 221 and the second curved portion 223. That is, the holder slimming groove 240 is defined as the second holder width HW2 is shorter than the first holder width HW1.

Therefore, compared to the case where both the horizontal part 210 and the vertical part 220 are formed to have the same width, the volume and weight of the shaft holder 200 are reduced by the volume of the holder slimming groove 240 and the weight of each curved portion 221, 223 having a volume corresponding to the above volume.

A plurality of holder slimming grooves 240 may be formed. The plurality of upper slimming grooves 140 may be respectively positioned adjacent to each of the curved portions 221, 223. In the illustrated exemplary embodiment, the holder slimming groove 240 is formed at the left and right ends of each of the curved portions 221, 223, respectively.

The holder slimming groove 240 may communicate with the holder space S2. In the illustrated exemplary embodiment, the holder slimming groove 240 is in communication with the holder space S2 in the vertical direction.

In the shaft holder 200 according to an exemplary embodiment of the present disclosure, the volume and weight of the vertical part 220 are reduced by the volume of the holder slimming groove 240 and the weight of the vertical part 220 having a volume corresponding thereto.

Accordingly, the operation performance of the movable contact part 40 may be improved.

(3) Description of the Movable Contact 300

Referring to FIGS. 24 to 31, the movable contact part 40 according to an exemplary embodiment of the present disclosure includes a movable contact 300.

The movable contact 300 is in contact with the fixed contact 22 according to the application of the control power. Accordingly, the direct current relay 1 is energized with an external power source and load. In addition, the movable contact 300 is spaced apart from the fixed contact 22 when the application of the control power is released. Accordingly, the direct current relay 1 is cut off from energization with an external power source and a load.

The movable contact 300 may be formed of a conductive material. The movable contact 300 in contact with the fixed contact 22 may be electrically connected to an external power source or load.

The movable contact 300 is positioned adjacent to the fixed contact 22.

The upper side of the movable contact 300 is covered by the upper yoke 100 and the shaft holder 200. Specifically, the cover part 110 of the upper yoke 100 and the horizontal part 210 of the shaft holder 200 are positioned above the movable contact 300.

In an exemplary embodiment, the upper side of the movable contact 300 may be in contact with the horizontal part 210. Further, in the above exemplary embodiment, the upper yoke 100 and the shaft holder 200 are positioned to surround each edge in the width direction of the movable contact 300, which is the front and rear sides in the illustrated exemplary embodiment.

The lower side of the movable contact 300 is surrounded by the lower yoke 400 and the holder coupling part 500.

In an exemplary embodiment, the lower side of the movable contact 300 may be in contact with the lower yoke 400.

The movable contact 300 is elastically supported by the elastic member 39. In addition, the support rod 600 is coupled through the movable contact 300.

In this case, the elastic member 39 may elastically support the movable contact 300 in a compressed state by a predetermined length such that the movable contact 300 does not move in a direction opposite to the fixed contact 22 (i.e., downward).

The movable contact 300 is formed to extend in the longitudinal direction, which is the left-right direction in the illustrated exemplary embodiment. That is, the length of the movable contact 300 is formed to be longer than the width thereof. Accordingly, both ends in the longitudinal direction of the movable contact 300 accommodated in the shaft holder 200 are exposed to the outside of the shaft holder 200.

The length of the movable contact 300, that is, the length in the left-right direction in the illustrated exemplary embodiment may be longer than the distance at which the plurality of fixed contacts 22 are spaced apart from each other. Accordingly, even if the movable contact 300 is slightly moved in the longitudinal direction, the contact reliability between the movable contact 300 and the fixed contact 22 may be maintained.

In the illustrated exemplary embodiment, the movable contact 300 includes a body part 310, a boss part 320 and a contact coupling part 330.

The body part 310 forms the outer shape of the movable contact 300. The body part 310 is formed to have a length in the longitudinal direction, which is the left-right direction in the illustrated exemplary embodiment, longer than the width direction, which is the front-rear direction in the illustrated exemplary embodiment.

In the illustrated exemplary embodiment, a recessed part 311 and a penetrating part 312 are formed inside the body part 310.

The recessed part 311 is a space into which a member for supporting the support rod 600 is inserted. The recessed part 311 is formed to be recessed on one side surface of the body part 310 facing the upper yoke 100 or the shaft holder 200, which is the upper side surface in the illustrated exemplary embodiment.

In the illustrated exemplary embodiment, the recessed part 311 has a circular cross-section and is formed to be recessed by a predetermined length downward. In the above exemplary embodiment, the center of the cross-section of the recessed part 311 may be located on the same axis as the center of the cross-section of the penetrating part 312 and the support rod 600.

The recessed part 311 communicates with the penetrating part 312.

The penetrating part 312 is a space through which the support rod 600 is coupled. The penetrating part 312 is formed through the inside of the body part 310 in the thickness direction, which is the vertical direction in the illustrated exemplary embodiment.

In the illustrated exemplary embodiment, the penetrating part 312 has a circular cross-section and is formed to be recessed by a predetermined length downward. In the above exemplary embodiment, the diameter of the cross-section of the penetrating part 312 may be smaller than the diameter of the cross-section of the recessed part 311.

The boss part 320 is a portion in which the movable contact 300 is coupled to the lower yoke 400. The boss part 320 is inserted and coupled to the lower through-hole 413 of the lower yoke 400.

The boss part 320 is formed to protrude from the body part 310 toward the lower yoke 400. In the illustrated exemplary embodiment, the boss part 320 is formed to protrude downward from the lower surface of the body part 310 toward the lower yoke 400.

In the illustrated exemplary embodiment, the boss part 320 has a circular cross-section and has a cylindrical shape with a hollow formed therein. The hollow formed inside the boss part 320 may be formed by extending the through part 312.

In addition, the outer diameter of the cross-section of the boss part 320 may be formed to be less than or equal to the diameter of the cross-section of the lower through-hole 413 of the lower yoke 400.

In the above exemplary embodiment, the center of the cross-section of the boss part 320 may be located on the same axis as the center of the cross-section of the recessed part 311 and the penetrating part 312. Accordingly, the center of the cross-section of the boss part 320 may be located on the same axis as the axis of the support rod 600.

The contact coupling part 330 is a portion in which the movable contact 300 is coupled to the shaft holder 200 and the lower yoke 400. Specifically, the contact coupling part 330 is coupled to the holder coupling part 230 of the shaft holder 200 and the lower coupling part 430 of the lower yoke 400, respectively.

A plurality of contact coupling parts 330 may be provided. In the illustrated exemplary embodiment, two contact coupling parts 330 are provided, respectively, to be positioned in the front-rear direction of the body part 310. Further, in the illustrated exemplary embodiment, the contact coupling parts 330 are spaced apart from each other and disposed to face each other with the recessed part 311 or the penetrating part 312 interposed therebetween.

In other words, the plurality of contact coupling parts 330 are disposed to be spaced apart from each other along a direction in which the body part 310 extends to be shorter. The plurality of contact coupling parts 330 are respectively coupled to the plurality of holder coupling parts 230 and the lower coupling part 430.

Accordingly, the movable contact 300 is coupled to the shaft holder 200 and the lower yoke 400 at a plurality of positions, respectively, and the coupled state may be stably maintained.

In the illustrated exemplary embodiment, the contact coupling part 330 includes a contact groove 331 and a contact protrusion 332.

The contact groove 331 is located on one side surface of the body part 310 facing the lower yoke 400, which is the lower side surface in the illustrated exemplary embodiment. The contact groove 331 is formed to be recessed on the one side surface of the body part 310.

The lower protrusion 431 of the lower yoke 400 is inserted and coupled to the contact groove 331. Accordingly, the movable contact 300 may be coupled to the lower yoke 400 by the boss part 320 and the contact groove 331.

For stable coupling between the movable contact 300 and the lower yoke 400, the contact groove 331 may be formed to correspond to the shape of the lower protrusion 431.

That is, in the illustrated exemplary embodiment, the contact groove 331 has a circular cross-section and is formed to be recessed by a predetermined distance upward. In addition, the lower protrusion 441 also has a circular cross-section and is formed to protrude toward the movable contact 300 (refer to FIG. 32).

In this case, the diameter of the cross-section of the contact groove 331 may be greater than or equal to the diameter of the cross-section of the lower protrusion 441. In addition, the distance at which the contact groove 331 is formed to be recessed may be greater than or equal to the length at which the lower protrusion 441 is formed to protrude.

Accordingly, the lower protrusion 441 may be stably coupled to the contact groove 331. In an exemplary embodiment, the contact groove 331 may be formed to have the same diameter and depth as the lower protrusion 441 such that the lower protrusion 441 is fitted and coupled to the contact groove 331.

Figure 31:
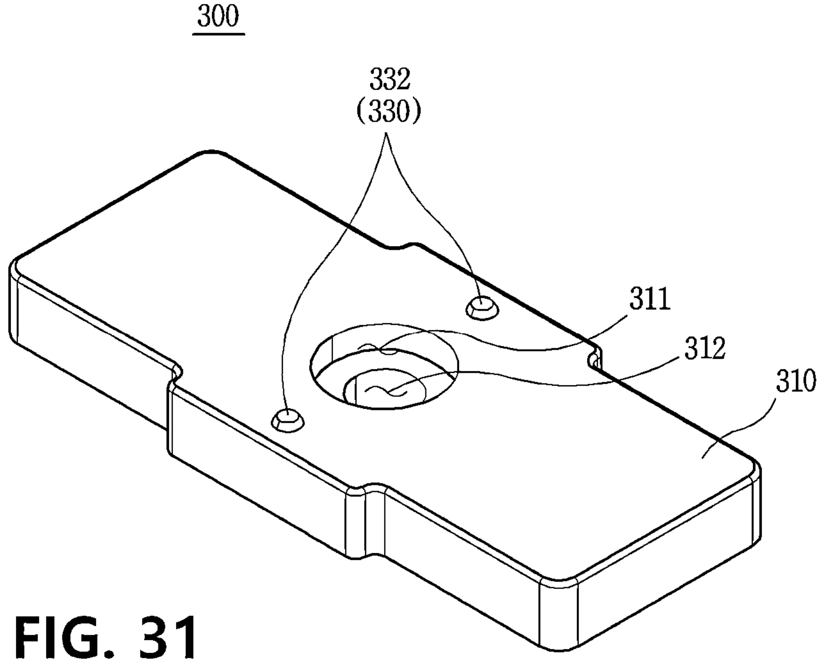
FIG. 31 is a perspective view showing a modified example of the movable contact part of FIG. 24.
Figure 32:
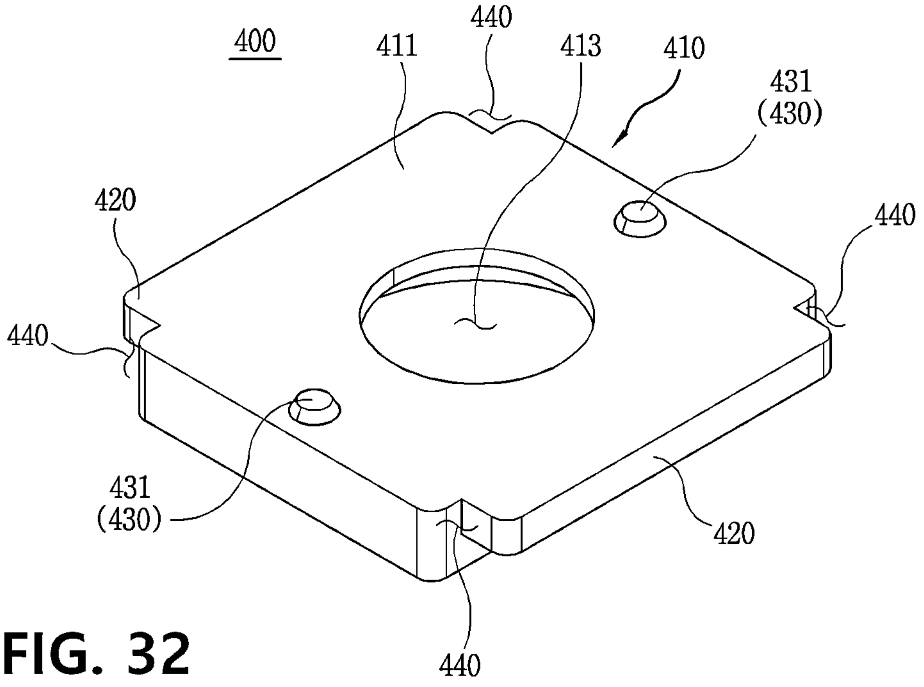
FIG. 32 is a perspective view illustrating a lower yoke provided in the movable contact part of FIG. 6.

In the exemplary embodiment illustrated in FIG. 31, the contact coupling part 330 may include a contact protrusion 332.

The contact protrusion 332 is located on the other side surface of the body part 310 facing the horizontal part 210 of the shaft holder 200, which is the upper side surface in the illustrated exemplary embodiment. The contact protrusion 332 is formed to protrude upward from the other side surface of the body part 310.

In the illustrated exemplary embodiment, the contact protrusion 332 has a circular cross-section and is provided in a disk shape having a thickness in the vertical direction. In the above exemplary embodiment, the center of the cross-section of the contact protrusion 332 may be disposed on the same axis in the vertical direction as the center of the cross-section of the contact groove 331.

The contact protrusion 332 is inserted into the holder groove 232 of the holder coupling part 230. As described above, the cross-sectional shape of the contact protrusion 332 may be formed to correspond to the cross-sectional shape of the holder groove 232.

In addition, the diameter of the cross-section of the contact protrusion 332 is formed to be less than the diameter of the cross-section of the holder groove 232, and the length at which the contact protrusion 332 protrudes is less than the length at which the holder groove 232 is recessed.

(4) Description of the Lower Yoke 400

Referring to FIGS. 32 to 38, the movable contact part 40 according to an exemplary embodiment of the present disclosure includes a lower yoke 400.

The lower yoke 400 attenuates an electrical repulsive force which is generated when the fixed contact 22 and the movable contact 300 come into contact when control power is applied, that is, an electromagnetic repulsive force. When the control power is applied, the lower yoke 400 is magnetized to generate an attractive force.

The lower yoke 400 is positioned to surround the movable contact 300 from the other side of the movable contact 300. In the illustrated exemplary embodiment, the lower yoke 400 is located below the movable contact 300 and is disposed to face the horizontal part 210 of the shaft holder 200 with the movable contact 300 interposed therebetween.

In other words, the lower yoke 400 is positioned between the movable contact 300 and the holder coupling part 500.

The lower yoke 400 partially surrounds the movable contact 300. In the illustrated exemplary embodiment, the lower yoke 400 surrounds the lower side of the movable contact 300.

The lower yoke 400 is coupled to the movable contact 300. Specifically, the lower coupling part 430 of the lower yoke 400 is coupled to the contact coupling part 330 of the movable contact 300. In addition, the support rod 600 may be through-coupled to the movable contact 300 and the lower yoke 400, respectively, such that the movable contact 300 and the lower yoke 400 may be coupled to each other.

The lower yoke 400 is disposed to face the upper yoke 100. Specifically, the lower yoke 400 is disposed to face the upper yoke 100 with the horizontal part 210 and the movable contact 300 of the shaft holder 200 interposed therebetween.

The lower yoke 400 may be magnetized to form an electromagnetic attraction force. The electromagnetic attraction force formed by the lower yoke 400 is transmitted to the upper yoke 100, and presses the movable contact 300 seated on the upper yoke 100 and the lower yoke 400 toward the fixed contact 22.

Accordingly, the electromagnetic repulsive force generated between the fixed contact 22 and the movable contact 300 may be attenuated by the electromagnetic attraction force. As a result, the contact state between the fixed contact 22 and the movable contact 300 may be stably maintained.

The lower yoke 400 may be magnetized as current or magnetic field is applied, and it may be provided in any form capable of forming electromagnetic attraction with the lower yoke 400.

In the illustrated exemplary embodiment, the lower yoke 400 includes a support part 410, a wing part 420, a lower coupling part 430 and a lower slimming groove 440.

The support part 410 forms a portion of the outer shape of the lower yoke 400. The support part 410 surrounds one side of the movable contact 300, which is the lower side in the illustrated exemplary embodiment. The support part 410 supports the movable contact 300 from the lower side.

The support part 410 partially surrounds the lower space S3. In the illustrated exemplary embodiment, the lower space inside the support part 410 may be defined as the lower space S3. An upper end of the elastic member 39 may be positioned in the lower space S3.

In the illustrated exemplary embodiment, the support part 410 has a rectangular cross-section in which the length in the front-rear direction is longer than the length in the left-right direction, and is formed in the shape of a rectangular parallelepiped or a rectangular plate having a vertical height.

The shape of the support part 410 may be changed according to the shapes of the shaft holder 200 and the movable contact 300.

Figure 38:
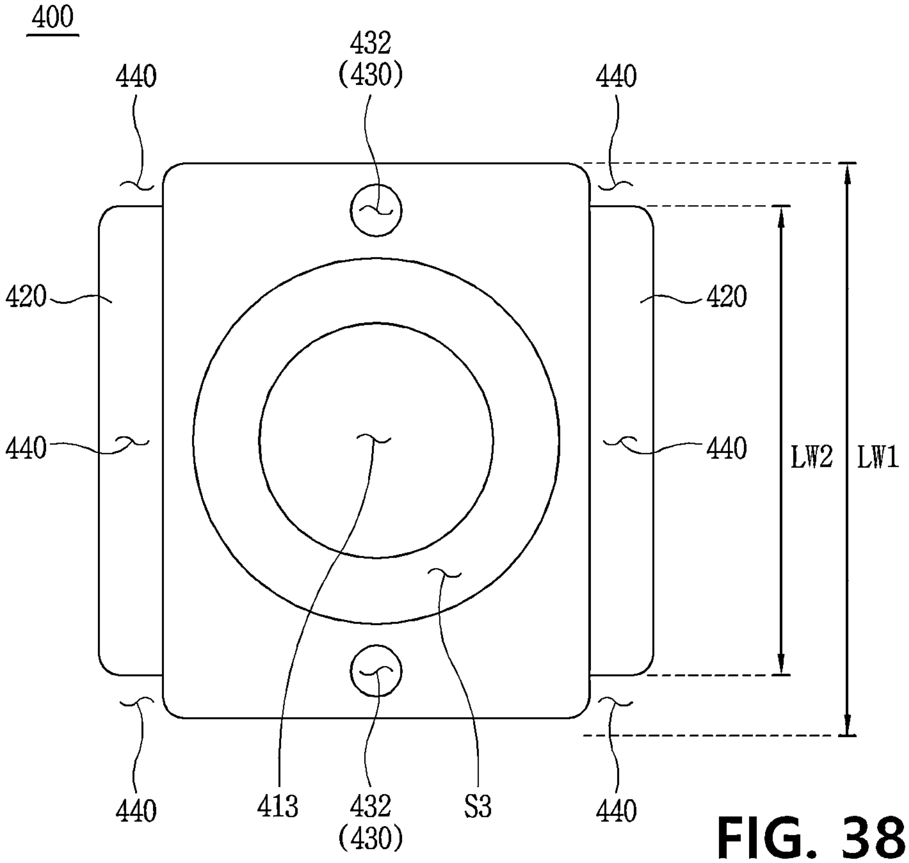
FIG. 38 is a bottom view showing the lower yoke of FIG. 32.

In this case, the length of the support part 410 in the front-rear direction may be defined as a first lower width LB1 (refer to FIG. 38). The first lower width LB1 of the support part 410 is formed to be longer than the second lower width LB2 of the wing part 420.

Figure 33:
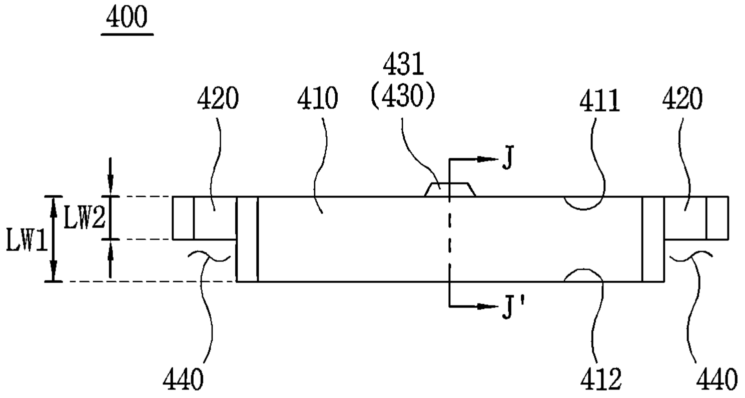
FIG. 33 is a front view showing the lower yoke of FIG. 32.
Figure 33:
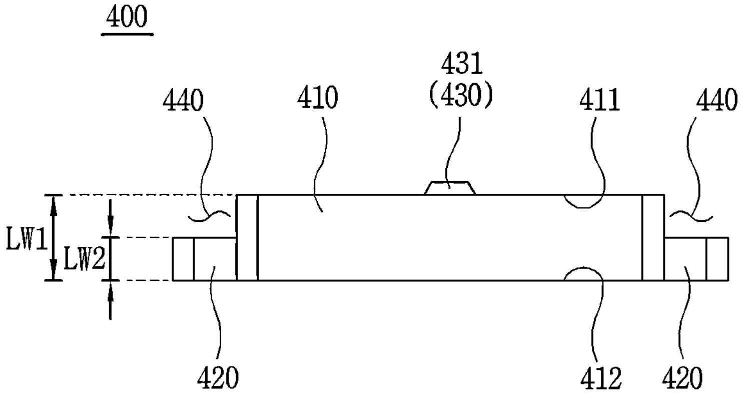
Figure 34:
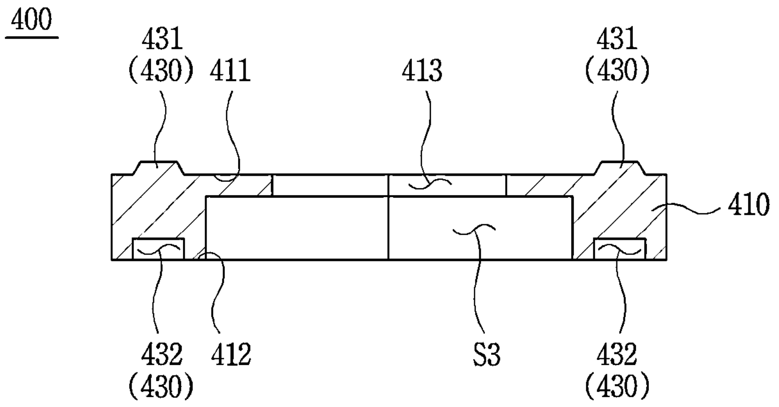
FIG. 34 is a cross-sectional view taken along line J-J' showing the lower yoke of FIG. 32.
Figure 35:
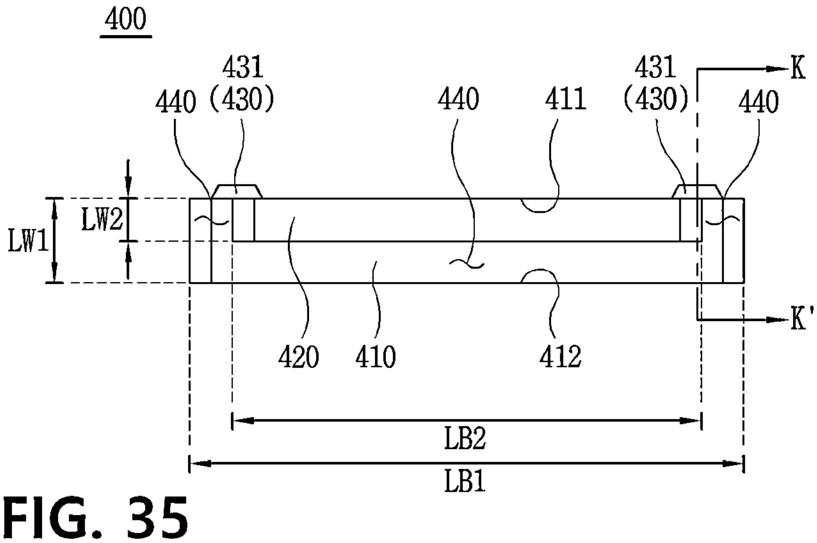
FIG. 35 is a side view showing the lower yoke of FIG. 32.
Figure 36:
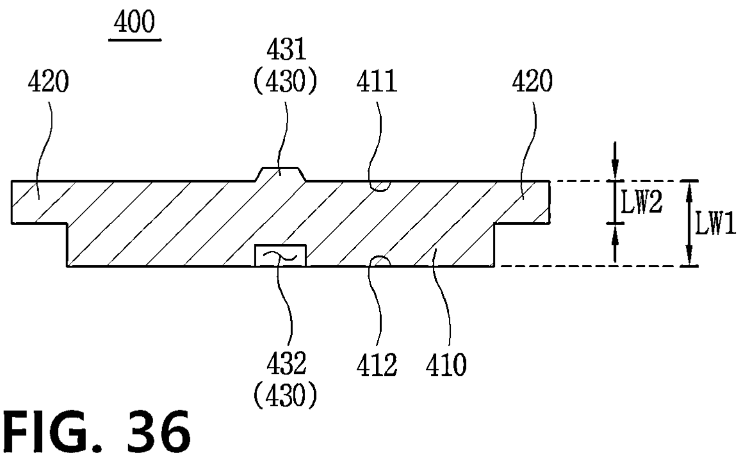
FIG. 36 is a cross-sectional view taken along line K-K' showing the lower yoke of FIG. 32.
Figure 37:
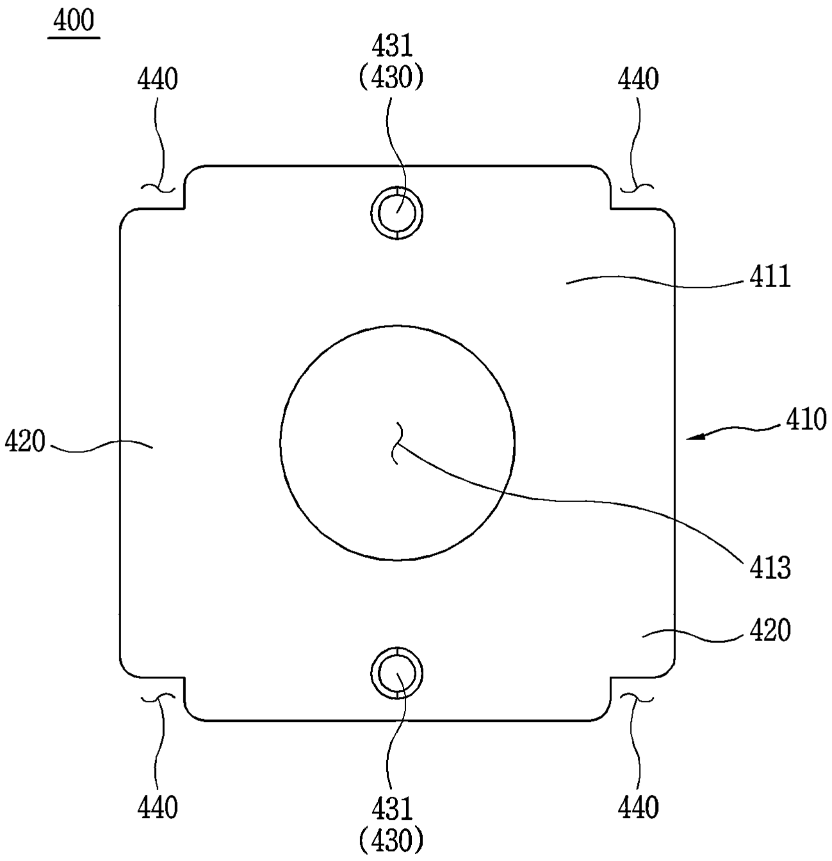
FIG. 37 is a plan view showing the lower yoke of FIG. 32.

The support part 410 is formed to have a predetermined thickness. That is, as illustrated in FIG. 33, the support part 410 is formed to have a thickness equal to the first lower width LW1. In this case, the first lower width LW1 of the support part 410 may be formed to be longer than the second lower width LW2 which is is the thickness of the wing part 420.

That is, the support part 410 is formed to be thicker than the wing part 420.

In the illustrated exemplary embodiment, the support part 410 includes an upper surface 411, a lower surface 412 and a lower through-hole 413.

The upper surface 411 is one side surface facing the movable contact 300 among the surfaces of the support part 410, which is the upper side surface in the illustrated exemplary embodiment. When the movable contact 300 and the lower yoke 400 are coupled, the upper surface 411 may be in contact with the lower surface of the movable contact 300. The lower protrusion 431 of the lower coupling part 430 is positioned on the upper surface 411.

The lower surface 412 is the other side surface opposite to the movable contact 300 among the surfaces of the support part 410, which is the side lower surface in the illustrated exemplary embodiment. A lower groove 432 of the lower coupling part 430 is formed on the lower surface 412.

The vertical distance between the upper surface 411 and the lower surface 412 may be defined as a first lower width LW1 which is is the thickness of the support part 410.

The lower through-hole 413 is a space through which the support rod 600 is coupled. The lower through-hole 413 is located inside the support part 410 and is formed through the support part 410 in the thickness direction, which is the vertical direction in the illustrated exemplary embodiment.

In the illustrated exemplary embodiment, the lower through-hole 413 is formed to have a circular cross-section. The shape of the lower through-hole 413 may be changed according to the shape of the support rod 600.

A wing part 420 is provided at a pair of edges facing each other among the edges of the support part 410, which are at each edge in the left-right direction in the illustrated exemplary embodiment. It will be understood that the direction of the edge at which the wing part 420 is provided is the same as the direction in which the body part 310 of the movable contact 300 extends longer.

The wing part 420 is continuous with the support part 410. The wing part 420 is formed to extend outwardly from the pair of edges of the support part 410, which are each edge in the left-right direction in the illustrated exemplary embodiment.

A plurality of wing parts 420 may be provided. The plurality of wing parts 420 may be continuous with the support part 410 at different positions. In the illustrated exemplary embodiment, two wing parts 420 are provided, respectively, to be continuous with the left and right edges of the support part 410.

The wing part 420 may be formed to have a predetermined thickness. The thickness may be defined as a second lower width LW2. In this case, the second lower width LW2 of the wing part 420 may be shorter than the first lower width LW1 of the support part 410. That is, the wing part 420 is formed to be thinner than the support part 410.

Accordingly, the coupling position of the wing part 420 and the support part 410 may be formed in various ways.

That is, in the exemplary embodiment illustrated in (a) of FIG. 33, the wing part 420 is coupled to the support part 410 to be biased toward the upper side. In the above exemplary embodiment, the upper surface of the wing part 420 may be located on the same plane as the upper surface 411 of the support part 410.

In the above exemplary embodiment, it will be understood that the position of the lower surface of the wing part 420 is moved from the lower side to the upper side. That is, the lower surface of the wing part 420 is located above the lower surface 412 of the support part 410.

In this case, the lower slimming groove 440 formed to reduce the weight and volume of the lower yoke 400 may be defined as a space surrounded by each surface of the support part 410 in the left-right direction and the lower surface of the wing part 420.

In the exemplary embodiment illustrated in (b) of FIG. 33, the wing part 420 is coupled to the support part 410 to be biased to the lower side. In the above exemplary embodiment, the lower surface of the wing part 420 may be located on the same plane as the lower surface 412 of the support part 410.

In the above exemplary embodiment, it will be understood that the position of the upper surface of the wing part 420 is moved from the upper side to the lower side. That is, the upper surface of the wing part 420 is located below the upper surface 411 of the support part 410.

In this case, the lower slimming groove 440 formed to reduce the weight and volume of the lower yoke 400 may be defined as a space surrounded by each surface of the support part 410 in the left-right direction and the upper surface of the wing part 420.

The wing part 420 may be formed to have a predetermined length, that is, a length in the front-rear direction in the illustrated exemplary embodiment. That is, as illustrated in FIG. 38, the length of the wing part 420 in the front-rear direction may be defined as a second lower width LB2.

In this case, the second lower width LB2 of the wing part 420 may be formed to be shorter than the first lower width LB1 of the support part 410. Accordingly, at each end of the wing part 420 in the longitudinal direction, that is, in the front-rear direction, a space formed by being surrounded by each surface of the front-rear direction of the wing part 420 and each surface of the support part 410 in the left-right direction is formed.

The space may also be defined as a lower slimming groove 440 formed to reduce the weight and volume of the lower yoke 400.

That is, at least one of the upper and lower sides of the wing part 420, and the lower thinning groove 440 may be formed in the front-rear direction.

The lower coupling part 430 is a portion in which the lower yoke 400 is coupled to the movable contact 300. Specifically, the lower coupling part 430 is coupled to the contact coupling part 330 of the movable contact 300.

A plurality of lower coupling parts 430 may be provided. In the illustrated exemplary embodiment, two lower coupling parts 430 are provided, respectively, to be positioned in the front-rear direction of the support part 410. Further, in the illustrated exemplary embodiment, the lower coupling parts 430 are spaced apart from each other and disposed to face each other with the lower through-hole 413 interposed therebetween.

In other words, the plurality of lower coupling parts 430 are disposed to be spaced apart from each other along a direction in which the support part 410 extends longer. The plurality of lower coupling parts 430 are respectively coupled to the plurality of contact coupling parts 330.

Accordingly, the lower yoke 400 and the movable contact 300 are coupled at a plurality of positions, and the coupled state may be stably maintained.

In the illustrated exemplary embodiment, the lower coupling part 430 includes a lower protrusion 431 and a lower groove 432.

The lower protrusion 431 is located on one side surface of the support part 410 facing the movable contact 300, which is the upper surface 411 in the illustrated exemplary embodiment. The lower protrusion 431 is formed to protrude upward from the upper surface 411 of the support part 410.

The shape of the lower protrusion 431 may be changed according to the shape of the lower groove 432. This is due to the lower protrusion 431 protruding while the lower groove 432 is pressed.

In the illustrated exemplary embodiment, the lower protrusion 431 has a circular cross-section and is provided in a disk shape having a thickness in the vertical direction. In the above exemplary embodiment, the center of the cross-section of the lower protrusion 431 may be disposed on the same axis in the vertical direction as the center of the cross-section of the lower groove 432.

In addition, the thickness of the lower protrusion 431 may be determined to correspond to the thickness of the lower groove 432. In an exemplary embodiment, the thickness of the lower protrusion 431 may be the same as the thickness of the lower groove 432.

The lower groove 432 is located on the other side surface of the support part 410 opposite to the movable contact 300, which is the lower surface 412 in the illustrated exemplary embodiment. The lower groove 432 is formed to be recessed on the lower surface 412 of the support part 410.

As described above, the position and shape of the lower groove 432 may be determined to correspond to the position and shape of the lower protrusion 431.

The lower slimming groove 440 may be defined as a space located outside among the spaces formed by being surrounded by the support part 410 and the wing part 420. The lower slimming groove 440 is a space formed by reducing the thickness and length of the wing part 420.

The lower slimming groove 440 is formed by a difference in thickness and length between the support part 410 and the wing 420. That is, the lower slimming groove 440 is defined as the second lower width LW2 of the wing part 420 is shorter than the first lower width LW1 of the support part 410.

In addition, the lower slimming groove 440 is defined as the second lower width LB2 of the wing part 420 is shorter than the first lower width LB1 of the support part 410.

Therefore, compared to the case where the thickness and length of the support part 410 and the wing part 420 are formed to be the same, the volume and weight of the lower yoke 400 are reduced by the volume of the lower slimming groove 440 and the weight of the wing part 420 having a volume corresponding to the above volume.

A plurality of lower slimming grooves 440 may be formed. The plurality of upper slimming grooves 140 may be located adjacent to each of the plurality of wing parts 420. In the illustrated exemplary embodiment, the lower slimming groove 440 is formed on one or more sides of the upper and lower sides, and the front and rear sides, respectively.

The lower thinning groove 440 may be formed to have a predetermined thickness. In the exemplary embodiment illustrated in FIG. 33, the lower slimming groove 440 is formed to have a thickness equal to the difference between the first lower width LW1 and the second lower width LW2.

The lower slimming groove 440 may be formed to have a predetermined width. In the exemplary embodiment illustrated in FIG. 38, the lower slimming groove 440 is formed to have a width equal to the difference between the first lower width LB1 and the second lower width LB2.

In the lower yoke 400 according to an exemplary embodiment of the present disclosure, the volume and weight of the wing part 420 are reduced by the volume of the lower slimming groove 440 and the weight of the wing part 420 having a volume corresponding thereto.

Accordingly, the operating performance of the lower yoke 400 may be improved. In addition, the durability against vibration and shock generated by the operation of the direct current relay 1 may be strengthened.

Meanwhile, the effect of reducing the electromagnetic repulsive force which is one role of the lower yoke 400 may be improved as the area of the lower yoke 400 increases.

Accordingly, the lower yoke 400 according to an exemplary embodiment of the present disclosure is formed such that the lower slimming groove 440 is formed around the wing part 420 to increase the surface area of the wing part 420 exposed to the outside.

Therefore, the lower yoke 400 according to an exemplary embodiment of the present disclosure may reduce the weight to improve the operating performance and the durability against vibration and shock, and at the same time maximize the effect of reducing electromagnetic repulsive force.

(5) Description of the Holder Coupling Part 500 and the Support Rod 600

Referring again to FIGS. 6 to 9, the movable contact part 40 according to an exemplary embodiment of the present disclosure includes a holder coupling part 500 and a support rod 600.

The holder coupling part 500 is a portion to which the shaft holder 200 is coupled. The vertical part 220 of the shaft holder 200 may be coupled to the holder coupling part 500 to form a holder space S2 which is a space in which the movable contact 300 is accommodated.

The holder coupling part 500 surrounds another portion of the holder space S2, which is the lower side in the illustrated exemplary embodiment. The holder coupling part 500 may elastically support the elastic member 39 accommodated in the holder space S2.

The shaft holder 200 may be inserted and coupled to the holder coupling part 500. Specifically, a boss part is formed to protrude upward at each end of the holder coupling part 500 in the longitudinal direction, which is the front-rear direction in the illustrated exemplary embodiment. The vertical parts of the shaft holder 200 may be respectively inserted and coupled to the boss parts.

In an exemplary embodiment, the holder coupling part 500 and the shaft holder 200 may be insert injection-molded. Alternatively, the holder coupling part 500 and the shaft holder 200 may be manufactured and coupled to each other.

The support rod 600 functions as a central axis of the upper yoke 100, the shaft holder 200, the movable contact 300 and the lower yoke 400. The support rod 600 is through-coupled to the upper yoke 100, the shaft holder 200, the movable contact 300 and the lower yoke 400, respectively.

Specifically, the support rod 600 is through-coupled to the upper through-hole 111, the holder through-hole 211, the through-portion 312 and the lower through-hole 413, respectively. As described above, the center of the upper through-hole 111, the holder through-hole 211, the penetrating part 312 and the lower through-hole 413, and the support rod 600 may be disposed to have the same central axis.

In the illustrated exemplary embodiment, the support rod 600 is provided in a tubular shape having a circular cross-section and a hollow formed therein. The shape of the support rod 600 may be changed according to the shapes of the upper through-hole 111, the holder through-hole 211, the through-portion 312 and the lower through-hole 413.

The support rod 600 also penetrates through the hollow formed inside the elastic member 39. Accordingly, the elastic member 39 may also be maintained on the same central axis as the upper through-hole 111, the holder through-hole 211, the penetrating part 312 and the lower through-hole 413.

4. Description of the Structural Size Relationship Between the Upper Yoke 100 and the Lower Yoke 400

As described above, the weights of the upper yoke 100 and the lower yoke 400 according to an exemplary embodiment of the present disclosure are reduced through structural changes such that the operational reliability of the movable contact part 40 may be improved.

At the same time, in the upper yoke 100, the thickness of the cover part 110 is formed to be thicker than the thickness of the arm part 120, and the length in the front-rear direction of the extension portion 122 is formed to be sufficiently long.

Furthermore, the lower yoke 400 is formed such that the surface areas of the support part 410 and the wing part 420 are sufficiently increased.

As a result, in the movable contact part 40 according to an exemplary embodiment of the present disclosure, sufficient electromagnetic force to attenuate the electromagnetic repulsive force between the fixed contact 22 and the movable contact 300 may be formed.

Hereinafter, the structural size relationship between the upper yoke 100 and the lower yoke 400 according to an exemplary embodiment of the present disclosure will be described in detail with reference to FIGS. 11, 15, 16, 33, 35, 36 and 38 again.

As described above, the upper yoke 100 includes the arm part 120 which is deformed in shape to reduce the weight while increasing the surface area thereof.

That is, the second upper width UW2 which is the thickness of the arm part 120 is formed to be smaller than the first upper width UW1 which is the thickness of the cover part 110. As the thickness of the arm part 120 is reduced, the space formed between the cover part 110 and the arm part 120 is defined as an upper slimming groove 140.

In addition, the second upper width UB2 which is the width of the curved portion 121 of the arm part 120 is formed to be smaller than the first upper width UB1 which is the width of the extension portion 122 of the cover part 110 and the arm part 120. As the width of the curved portion 121 is reduced, the upper slimming groove 140, which is a space surrounded by the cover part 110, the curved portion 121 and the extension portion 122, is formed at each end of the curved portion 121 in the width direction, which is at the end in the left-right direction in the illustrated exemplary embodiment.

Accordingly, the weight of the upper yoke 100 may be reduced by a weight corresponding to the volume of the arm part 120 by the volume of the upper slimming groove 140.

In addition, as the thickness of the arm part 120 is reduced, a portion of the cover part 110 is exposed to the outside where the arm part 120 and the cover part 110 are coupled.

Accordingly, the surface area of the cover part 110 and the upper yoke 100 including the same may be increased. In addition, the thickness and length of the cover part 110 and the extension portion 122 are formed to be sufficiently thick and long.

Meanwhile, the electromagnetic force formed by the upper yoke 100 in order to attenuate the electromagnetic repulsive force generated between the fixed contact 22 and the movable contact 300 is proportional to the surface area and thickness of the upper yoke 100.

On the other hand, the operational reliability of the movable contact part 40 and the durability against vibration and shock are inversely proportional to the weight of the upper yoke 100.

As a result, the upper yoke 100 according to an exemplary embodiment of the present disclosure may maintain the strength of the magnetic force formed while increasing the surface area and reducing the overall weight, thereby improving the operational reliability and durability against vibration and shock.

Similarly, the lower yoke 400 also includes a shape-deformed wing part 420 to increase the surface area and reduce the weight.

That is, the second lower width LW2 which is the thickness of the wing part 420 is formed to be smaller than the first lower width LW1 which is the thickness of the support part 410. As the thickness of the wing part 420 is reduced, the space formed between the support part 410 and the wing part 420 is defined as a lower slimming groove 440.

In addition, the second lower width LB2 which is the length of the wing part 420 is formed to be smaller than the first lower width LB1 which is the length of the support part 410. As the length of the wing part 420 is reduced, the lower slimming groove 440, which is a space surrounded by the support part 410 and the wing part 420, is formed at each end in the longitudinal direction of the wing part 420, which is at each end in the front-rear direction in the illustrated exemplary embodiment.

Accordingly, the weight of the lower yoke 400 may be reduced by a weight corresponding to the volume of the wing part 420 by the volume of the lower slimming groove 440.

In addition, as the thickness of the wing part 420 is reduced, a portion of the support part 410 is exposed to the outside where the wing part 420 and the support part 410 are coupled.

Accordingly, the surface area in which the support part 410 and the lower yoke 400 including the support part 410 are exposed to the outside may be increased. In addition, the thickness and length of the support part 410 are formed to be sufficiently thick and long.

Meanwhile, the electromagnetic force formed by the lower yoke 400 to attenuate the electromagnetic repulsive force generated between the fixed contact 22 and the movable contact 300 is proportional to the surface area and thickness of the lower yoke 400.

On the other hand, the operational reliability of the movable contact part 40 and the durability against vibration and shock are inversely proportional to the weight of the lower yoke 400.

As a result, the lower yoke 400 according to an exemplary embodiment of the present disclosure may maintain the strength of the magnetic force formed while the overall weight is reduced, thereby improving the operational reliability and durability against vibration and shock.

Furthermore, the structural size relationship between the upper yoke 100 and the lower yoke 400 may be formed.

First of all, the size relationship of thickness may be established between the cover part 110 of the upper yoke 100 and the support part 410 of the lower yoke 400.

Specifically, the first upper width UW1 which is the thickness of the cover part 110 may be less than or equal to the first lower width LW1 which is the thickness of the support part 410. In other words, the cover part 110 may be formed to have a thickness equal to or smaller than the thickness of the support part 410.

Similarly, the size relationship of thickness may be established between the arm part 120 of the upper yoke 100 and the wing part 420 of the lower yoke 400.

Specifically, the second upper width UW2 which is the thickness of the arm part 120 may be less than or equal to the second lower width LW2 which is the thickness of the wing part 420. In other words, the arm part 120 may be formed to have a thickness equal to or smaller than that of the wing part 420.

In addition, due to this structural size relationship, the total volume of the upper yoke 100, that is, the sum of the volumes of the cover part 110 and the arm part 120, may be less than or equal to the total volume of the lower yoke 400, that is, the sum of the volumes of the support part 410 and the wing part 420.

That is, the total volume of the upper yoke 100 may be formed to be equal to or smaller than the total volume of the lower yoke 400.

Considering that the lower yoke 400 supports the upper yoke 100, the shaft holder 200 and the movable contact 300 from the lower side, each component of the movable contact part may be stably supported and coupled by the above difference.

In addition, the size relationship of the structure may be determined in consideration of the strength of the magnetic forces formed by the upper yoke 100 and the lower yoke 400 and the weights of the upper yoke 100 and the lower yoke 400.

That is, as described above, the strength of the magnetic forces formed by the upper yoke 100 and the lower yoke 400 is proportional to the thickness and the size of the surface areas of the upper yoke 100 and the lower yoke 400.

On the other hand, the operational reliability of the movable contact part 40 including the upper yoke 100 and the lower yoke 400 is inversely proportional to the weight of the upper yoke 100 and the lower yoke 400.

Therefore, the weight reduction and size change of the upper yoke 100 and the lower yoke 400 must be determined by considering the strength of the magnetic force formed by the upper yoke 100 and the lower yoke 400 and the operational reliability of the movable contact part 40.

That is, it will be understood that the size relationship of the structure may be determined by considering the effect of attenuating the electromagnetic repulsive force generated between the fixed contact 22 and the movable contact 300, the operational reliability of the movable contact part 40, the durability against vibration and shock and the like.

5. Description of the Coupling Relationship of the Movable Contact Part 40 According to an Exemplary Embodiment of the Present Disclosure Each component of the movable contact part 40 according to an exemplary embodiment of the present disclosure includes coupling parts 130, 230, 330, 430, respectively. When each component of the movable contact part 40 is coupled to each other, each coupling part 130, 230, 330, 430 is coupled to one or more other coupling parts 130, 230, 330, 430.

Accordingly, each component provided in the movable contact part 40, that is, the upper yoke 100, the shaft holder 200, the movable contact 300 and the lower yoke 400 may be stably coupled.

In addition, each coupling part 130, 230, 330, 430 may be provided without excessive structural changes of the upper yoke 100, the shaft holder 200, the movable contact 300 and the lower yoke 400. Accordingly, the degree of freedom in design of the movable contact part 40 may be improved, and it can be easily applied to an existing structure.

Figure 39:
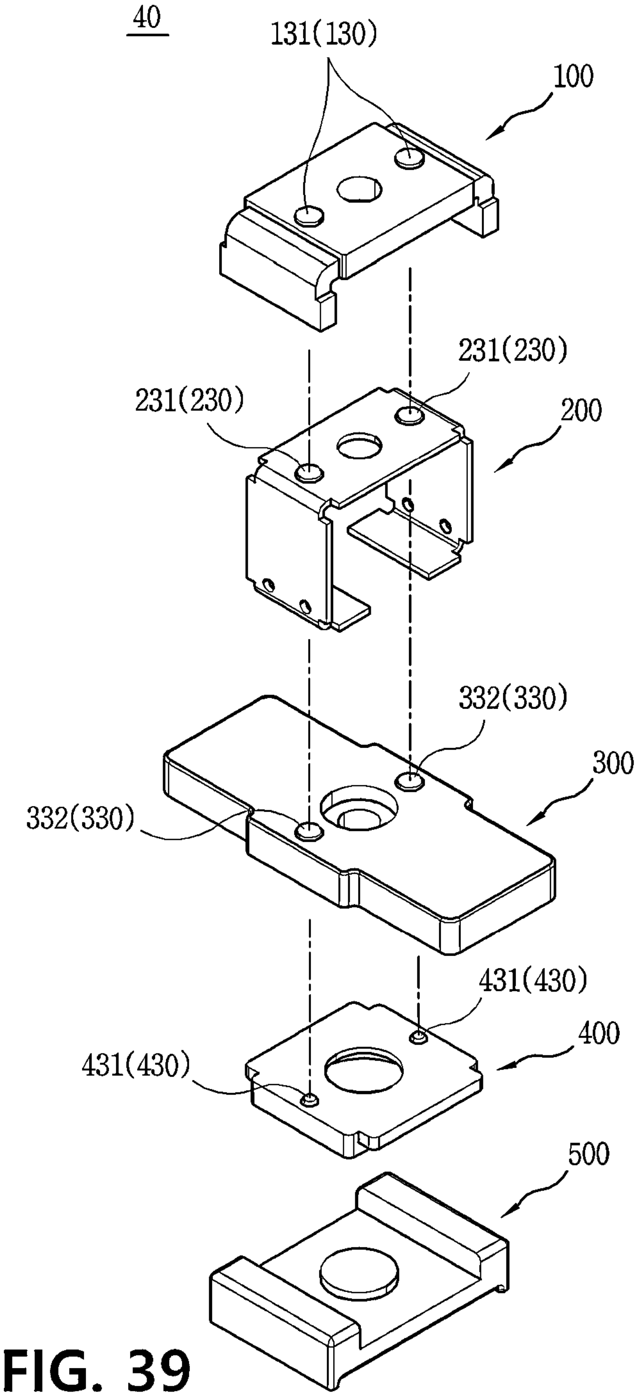
FIG. 39 is an exploded perspective view illustrating a process in which the movable contact part is coupled according to an exemplary embodiment of the present disclosure.
Figure 40:
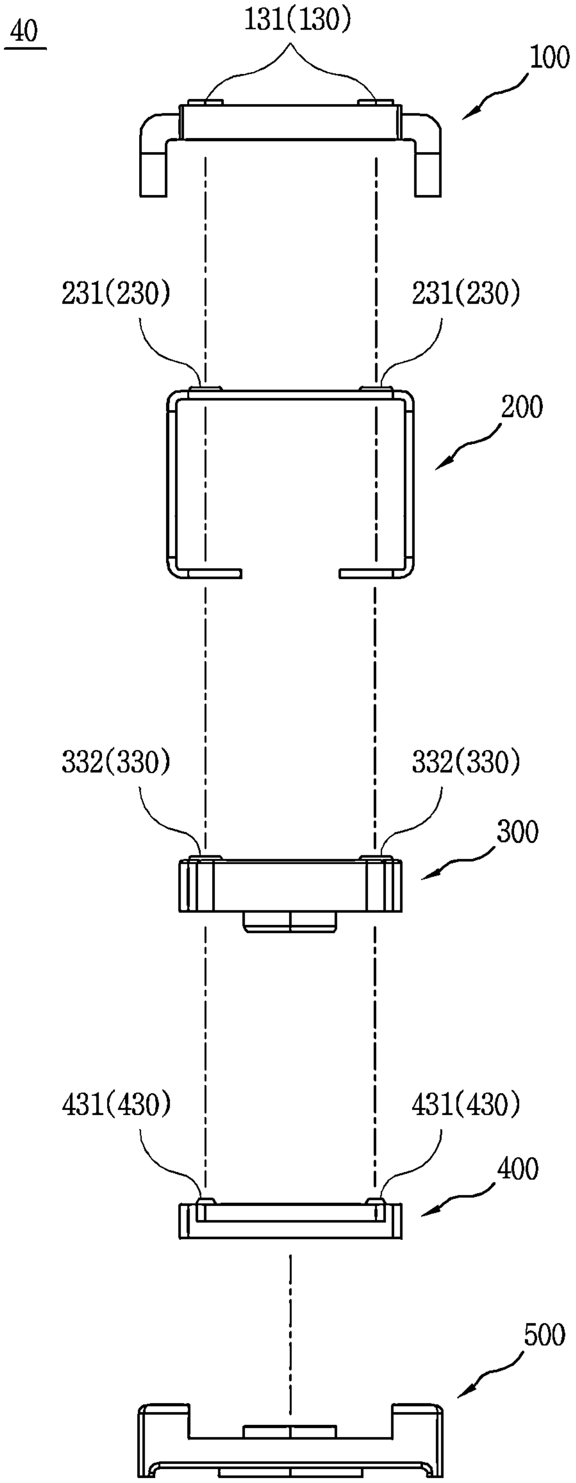
FIG. 40 is an exploded side view illustrating a process in which a movable contact part is coupled according to an exemplary embodiment of the present disclosure.

Hereinafter, the coupling relationship of the movable contact part 40 according to an exemplary embodiment of the present disclosure will be described in detail with reference to FIGS. 8, 39 and 40.

First of all, the upper yoke 100 is coupled to the shaft holder 200. In this case, the holder protrusion 231 which is formed to protrude from the upper side surface of the horizontal part 210 is inserted and coupled to the upper groove 132 which is formed to be recessed on the lower side surface of the cover part 110.

In addition, the shaft holder 200 is coupled to the movable contact 300. In this case, the contact protrusion 332 which is formed to protrude from the upper side of the body part 310 is inserted and coupled to the holder groove 232 which is formed to be recessed on the lower side surface of the horizontal part 210.

In addition, the movable contact 300 is coupled to the lower yoke 400. In this case, the lower protrusion 431 which is formed to protrude from the upper surface 411 of the support part 410 is inserted and coupled to the contact groove 331 which is formed to be recessed on the lower side surface of the body part 310.

In this case, the boss part 320 which is positioned under the movable contact 300 is inserted and coupled to the lower through-hole 413 of the lower yoke 400.

As described above, each coupling part 130, 230, 330, 430 may be disposed on the same axis in the coupling direction, which is the vertical direction in the illustrated exemplary embodiment.

Therefore, the movable contact part 40 according to an exemplary embodiment of the present disclosure may be stably coupled only by providing each coupling part 130, 230, 330, 430 while minimizing a change in structure.

Accordingly, even if vibration is generated as the movable contact part 40 and the direct current relay 1 including the same are operated, the coupled state of the movable contact part 40 may be stably maintained.

Meanwhile, the number, arrangement method and shape of each coupling part 130, 230, 330, 430 may be modified in various forms.

That is, in the illustrated exemplary embodiment, each coupling part 130, 230, 330, 430 is provided with two, respectively.

Alternatively, each coupling part 130, 230, 330, 430 may be provided with a single to three or more.

In the illustrated exemplary embodiment, each of the two coupling parts 130, 230, 330, 430 is positioned to be spaced apart from each other.

Specifically, the two upper coupling parts 130 are spaced apart from each other in the front-rear direction and disposed with the upper through-hole 111 interposed therebetween. The two holder coupling parts 230 are spaced apart from each other in the front-rear direction and disposed with the holder through-hole 211 interposed therebetween.

In addition, the two contact coupling parts 330 are spaced apart from each other in the front-rear direction and disposed with the through part 312 interposed therebetween. Furthermore, the two lower coupling parts 430 are spaced apart from each other in the front-rear direction and disposed with the lower through-hole 413 interposed therebetween.

The arrangement method of each coupling part 130, 230, 330, 430 may be changed. For example, each coupling part 130, 230, 330, 430 may be disposed to be spaced apart from each other in the left-right direction. Alternatively, each coupling part 130, 230, 330, 430 may be disposed to be spaced apart from each other in an inclined direction with respect to the front-rear direction.

As another example, each coupling part 130, 230, 330, 430 may be formed to be driven in one direction. For example, each coupling part 130, 230, 330, 430 is may be disposed to be biased in any one direction within the cover part 110, the horizontal part 210, the body part 310 and the support part 410, respectively.

In the illustrated exemplary embodiment, each coupling part 130, 230, 330, 430 is symmetrically disposed with respect to the upper through-hole 111, the holder through-hole 211, the through-portion 312 and the lower through-hole 413, respectively.

Alternatively, each coupling part 130, 230, 330, 430 may be asymmetrically disposed along the front-rear direction or the left-right direction.

Although not illustrated, in an exemplary embodiment in which three or more respective coupling parts 130, 230, 330, 430 are provided, the arrangement method of each coupling part 130, 230, 330, 430 may be changed to another mode.

For example, each of the plurality of coupling parts 130, 230, 330, 430 may be disposed to form a predetermined angle with respect to a specific point as a center. In an exemplary embodiment, the predetermined angle may be formed to be the same.

That is, in the above exemplary embodiment, each of the plurality of coupling parts 130, 230, 330, 430 may form the same angle and may be disposed along the radially outer side of the specific point.

In the illustrated exemplary embodiment, each coupling part 130, 230, 330, 430 has a circular cross-section and is formed to have a predetermined thickness or height.

Specifically, the upper protrusion 131, the holder protrusion 231, the contact protrusion 332 and the lower protrusion 431 respectively have a circular cross-section, and is formed in the shape of a plate or column having a predetermined thickness (i.e., a length in the vertical direction).

In addition, the upper groove 132, the holder groove 232, the contact groove 331 and the lower groove 432 respectively have a circular cross-section and is formed in the shape or a plate or column having a predetermined depth (i.e., a length in the vertical direction).

Alternatively, the cross-section of each coupling part 130, 230, 330, 430 may be formed in the shape of a polygonal or an oval. In the above exemplary embodiment, it is sufficient if the shape and thickness or depth of the cross-sections of each coupling part 130, 230, 330, 430 coupled to each other are determined to correspond to each other.

That is, the upper groove 132 and the holder protrusion 231 are preferably formed to have corresponding shapes. In addition, it is preferable that the holder groove 232 and the contact protrusion 332 are formed to have corresponding shapes. Furthermore, it is preferable that the contact groove 331 and the lower protrusion 431 have corresponding shapes.

Although the above has been described with reference to the preferred exemplary embodiment of the present disclosure, it will be understood that those of ordinary skill in the art can variously modify and change the present disclosure within the scope without departing from the spirit and scope of the present disclosure as described in the claims below.

EXPLANATION OF REFERENCE NUMERALS

1: Direct current relay
10: Frame part
11: Upper frame
12: Lower frame
13: Support plate
20: Opening/closing part
21: Arc chamber
22: Fixed contact
23: Sealing member
30: Core part
31: Fixed core
32: Movable core
33: York
34: Bobbin
35: Coil
36: Return spring
37: Cylinder
38: Shaft
39: Elastic member
40: Movable contact part
100: Upper yoke
110: Cover part
111: Upper through-hole
120: Arm part
121: Curved portion
122: Extension portion
130: Upper coupling part
131: Upper protrusion
132: Upper groove
140: Upper slimming groove
200: Shaft holder
210: Horizontal part
211: Holder through-hole
220: Vertical part
221: First curved portion
222: Vertical extension portion
223: Second curved portion
224: Horizontal extension portion
225: Fastening hole
230: Holder coupling part
231: Holder protrusion
232: Holder groove
240: Holder slimming groove
300: Movable contact
310: Body part
311: Recessed part
312: Penetrating part
320: Boss part
330: Contact coupling part
331: Contact groove
332: Contact protrusion
400: Lower yoke
410: Support part
411: Upper surface
412: Lower surface

413: Lower through-hole
420: Wing part
430: Lower coupling part
431: Lower protrusion
432: Lower groove
440: Lower slimming groove
500: Holder coupling part
600: Support rod
1000: Direct current relay according to the related art
1100: Frame part according to the related art
1110: Upper frame according to the related art
1120: Lower frame according to the related art
1200: Contact part according to the related art
1210: Fixed contact according to the related art
1220: Movable contact according to the related art
1300: Actuator according to the related art
1310: Coil according to the related art
1320: Bobbin according to the related art
1330: Fixed core according to the related art
1340: Movable core according to the related art
1350: Movable shaft according to the related art
1360: Spring according to the related art
1400: Movable contact moving part according to the related art
1410: Movable contact support part according to the related art
1420: Movable contact cover according to the related art
1430: Elastic part according to the related art
S1: Upper space
S2: Holder space
S3: Lower space
UW1: First upper width
UW2: Second upper width
UB1: First upper width
UB2: Second upper width
HW1: First holder width
HW2: Second holder width
LW1: First lower width
LW2: Second lower width
LB1: First lower width
LB2: Second lower width

The invention claimed is:

1. A movable contact part, comprising:

a movable contact which is in contact with or spaced apart from a fixed contact;

an upper yoke which is located on a first side of the movable contact, covers a portion of the movable contact and forms a magnetic force, the upper yoke comprising:

a cover part, extending in a length direction from a first end to a second end, opposite to the first end, and in a width direction, orthogonal to the length direction, from a first face to a second face;

a first arm part, coupled to the first end of the cover part and extending in a height direction, orthogonal to the length direction and to the width direction; and a second arm part, coupled to the second end of the cover part and extending in the height direction;

wherein the cover part defines a plurality of upper grooves spaced apart from one another along the length direction that are defined on a first surface of the cover part that faces the movable contact;

and a shaft holder which is positioned between the movable contact and the upper yoke, the shaft holder comprising:

a horizontal part, extending in the length direction between a first end and a second end;

a first extension portion, coupled to the first end of the horizontal part and extending in the height direction; and a second extension portion, coupled to the second end of the horizontal part, opposite to the first end of the horizontal part, extending in the height direction;

wherein the horizontal part defines a plurality of holder protrusions that each protrude from a first surface of the horizontal part and is each inserted into a corresponding upper groove of the plurality of upper grooves; wherein each upper groove of the plurality of upper grooves extends for a first distance in the height direction into the cover part from the first surface of the cover part less than a thickness of the cover part between the first surface of the cover part and a second surface of the cover part opposite to the first surface of the cover part.

2. The movable contact part of claim 1, wherein each upper groove of the plurality of upper grooves and each holder protrusion of the plurality of holder protrusions is formed to have a circular cross-section.

3. The movable contact part of claim 1, wherein each upper groove of the plurality of upper grooves and each holder protrusion of the plurality of holder protrusions is formed to have a polygonal cross-section.

4. The movable contact part of claim 1, wherein the plurality of upper grooves is arranged symmetrically with respect to a center of the upper yoke with respect to the length direction and the width direction.

5. The movable contact part of claim 1, wherein the plurality of upper grooves is arranged asymmetrically with respect to a center of the upper yoke with respect to the length direction and the width direction.

6. The movable contact part of claim 1, wherein the horizontal part defines a holder groove on a second surface of the horizontal part, opposite to the first surface of the horizontal part, wherein the second surface faces the movable contact, and wherein the movable contact comprises a contact protrusion which is formed to protrude from a first surface that faces the shaft holder and is inserted into the holder groove.

7. The movable contact part of claim 6, wherein the holder groove and the contact protrusion are each formed to have a circular cross-section.

8. The movable contact part of claim 6, wherein the holder groove and the contact protrusion are each formed to have a polygonal cross-section.

9. The movable contact part of claim 6, wherein the holder groove is one of a plurality of holder grooves that are spaced apart from each other, and wherein the contact protrusion is one of a plurality of contact protrusions that are spaced apart from each other and disposed to correspond to positions of respective holder grooves of the plurality of holder grooves.

10. The movable contact part of claim 9, wherein the plurality of holder grooves are arranged symmetrically with respect to a center of the horizontal part with respect to the length direction and the width direction.

11. The movable contact part of claim 9, wherein the plurality of holder grooves are arranged asymmetrically with respect to a center of the movable contact with respect to the length direction and the width direction.

12. The movable contact part of claim 1, further comprising:

a lower yoke which is located on the second side of the movable contact, opposite to the first side of the movable contact, that supports the movable contact and forms a second magnetic force, wherein the movable contact defines a contact groove which is formed to be recessed on a surface on the second side of the movable contact that faces the lower yoke, and wherein the lower yoke comprises a lower protrusion which is formed to protrude from a first surface that faces the movable contact and is inserted into the contact groove.

13. The movable contact part of claim 12, wherein the contact groove and the lower protrusion are each formed to have a circular or polygonal cross-section.

14. The movable contact part of claim 12, wherein the contact groove is one of a plurality of contact grooves that are spaced apart from each other, and wherein the lower protrusion is one of a plurality of lower protrusions that are spaced apart from each other and disposed to correspond to positions of respective contact grooves of the plurality of contact grooves.

15. The movable contact part of claim 14, wherein the plurality of contact grooves is arranged symmetrically with respect to a center of the lower yoke with respect to the length direction and the width direction.

16. The movable contact part of claim 14, wherein the plurality of contact grooves is arranged asymmetrically with respect to a center of the lower yoke with respect to the length direction and the width direction.

17. A direct current relay, comprising:

a fixed contact which is energized with an external power source or load; and a movable contact part which is located below the fixed contact and moves in a direction toward the fixed contact and in a direction opposite to the fixed contact, wherein the movable contact part comprises:

a movable contact which is in contact with or spaced apart from the fixed contact, and formed to have a length in a first direction that is longer than a width in a second direction orthogonal to the first direction;

an upper yoke which is located on a first side of the movable contact and covers the movable contact, the upper yoke comprising:

a cover part, extending in the second direction from a first end to a second end, opposite to the first end, and in the first direction from a first face to a second face, wherein the cover part defines an upper groove on a first surface of the cover part that faces the movable contact;

a first arm part, coupled to the first end of the cover part and extending in a third direction, orthogonal to the first direction and to the second direction; and a second arm part, coupled to the second end of the cover part and extending in the third direction;

a shaft holder which is positioned between the upper yoke and the movable contact, and covers the movable contact, the shaft holder comprising:

a horizontal part, extending in the first direction between a first end and a second end, wherein the horizontal part defines a holder protrusion that protrudes from a first surface of the horizontal part and is each inserted into the upper groove;

a first extension portion, coupled to the first end of the horizontal part and extending in the third direction; and a second extension portion, coupled to the second end of the horizontal part, opposite to the first end of the horizontal part, extending in the third direction; and a lower yoke which supports the movable contact from a second side of the movable contact, opposite to the first side of the movable contact, wherein the upper yoke and the lower yoke respectively form a magnetic force that attenuates an electromagnetic repulsive force generated between the fixed contact and the movable contact; wherein each upper groove of the plurality of upper grooves extends for a first distance in the height direction into the cover part from the first surface of the cover part less than a thickness of the cover part between the first surface of the cover part and a second surface of the cover part opposite to the first surface of the cover part.

18. The direct current relay of claim 17, wherein the horizontal part of the shaft holder defines a holder groove on a surface that faces the movable contact, and wherein the movable contact defines a contact protrusion that protrudes from a surface facing the shaft holder and is inserted into the holder groove.

19. A movable contact part, comprising:

a movable contact which is in contact with or spaced apart from a fixed contact;

an upper yoke which is located on a first side of the movable contact, covers a portion of the movable contact and forms a magnetic force, the upper yoke comprising:

a cover part extending in a first direction between a first end and a second end;

a first arm part, coupled to the first end of the cover part and extending in a second direction, orthogonal to the first direction; and a second arm part, coupled to the second end of the cover part, opposite to the first end of the cover part, extending in the second direction;

wherein the cover part defines:

an upper groove which is formed to be recessed on a first surface of the cover part that faces the movable contact;

an upper through-hole defined between the first surface of the cover part and a second surface of the cover part, opposite to the first surface; and a shaft holder which is positioned between the movable contact and the upper yoke, comprising:

a horizontal part, extending in the first direction between a first end and a second end;

a first extension portion, coupled to the first end of the horizontal part and extending in the second direction; and a second extension portion, coupled to the second end of the horizontal part, opposite to the first end of the horizontal part, extending in the second direction;

wherein the horizontal part defines:

a holder protrusion that protrudes from a first surface of the horizontal part that faces the upper yoke and is inserted into the upper groove; and a holder through-hole defined between the first surface of the horizontal part and a second surface of the horizontal part, opposite to the first surface; and a support rod is penetratingly coupled to the upper yoke and the shaft holder through the upper through-hole and the holder through-hole; wherein each upper groove of the plurality of upper grooves extends for a first distance in the height direction into the cover part from the first surface of the cover part less than a thickness of the cover part between the first surface of the cover part and a second surface of the cover part opposite to the first surface of the cover part.

* * * * *